(12) United States Patent
Harris et al.

(10) Patent No.: US 9,967,264 B2
(45) Date of Patent: May 8, 2018

(54) THREAT DETECTION USING A TIME-BASED CACHE OF REPUTATION INFORMATION ON AN ENTERPRISE ENDPOINT

(71) Applicant: Sophos Limited, Abingdon Oxfordshire (GB)

(72) Inventors: Mark D. Harris, Oxon (GB); Simon Neil Reed, Wokingham (GB); Kenneth D. Ray, Seattle, WA (US); Neil Robert Tyndale Watkiss, Oxford (GB); Andrew J. Thomas, Oxfordshire (GB); Robert W. Cook, North Vancouver (CA)

(73) Assignee: Sophos Limited, Abingdon (GB)

( * ) Notice: Subject to any disclaimer, the term of this patent is extended or adjusted under 35 U.S.C. 154(b) by 0 days. days.

(21) Appl. No.: 14/485,790

(22) Filed: Sep. 14, 2014

(65) Prior Publication Data

US 2016/0080399 A1 Mar. 17, 2016

(51) Int. Cl.
*H04L 29/06* (2006.01)
(52) U.S. Cl.
CPC ........ *H04L 63/1416* (2013.01); *H04L 63/102* (2013.01); *H04L 63/107* (2013.01); *H04L 63/108* (2013.01); *H04L 63/1433* (2013.01)

(58) Field of Classification Search
None
See application file for complete search history.

(56) References Cited

U.S. PATENT DOCUMENTS 8,042,186 B1 10/2011 Polyakov et al.
9,160,757 B1 10/2015 Guo et al.
(Continued)

FOREIGN PATENT DOCUMENTS

WO WO-2013164821 11/2013
WO WO-2016038397 3/2016

OTHER PUBLICATIONS

ISA, "International Application Serial No. PCT/GB2015/052656, Search Report and Written Opinion dated Feb. 18, 2016", 19 pages.
(Continued)

*Primary Examiner* — Eleni A Shiferaw
*Assistant Examiner* — Andrew J Steinle
(74) *Attorney, Agent, or Firm* — Strategic Patents, P.C.

(57) ABSTRACT

Threat detection instrumentation is simplified by providing and updating labels for computing objects in a context-sensitive manner. This may include simple labeling schemes to distinguish between objects, e.g., trusted/untrusted processes or corporate/private data. This may also include more granular labeling schemes such as a three-tiered scheme that identifies a category (e.g., financial, e-mail, game), static threat detection attributes (e.g., signatures, hashes, API calls), and explicit identification (e.g., what a file or process calls itself). By tracking such data for various computing objects and correlating these labels to malware occurrences, rules can be written for distribution to endpoints to facilitate threat detection based on, e.g., interactions of labeled objects, changes to object labels, and so forth. In this manner, threat detection based on complex interactions of computing objects can be characterized in a platform independent manner and pre-processed on endpoints without requiring significant communications overhead with a remote threat management facility.

15 Claims, 17 Drawing Sheets

(56) References Cited

U.S. PATENT DOCUMENTS

| | | | |
|---|---|---|---|
| 2008/0082662 A1* | 4/2008 | Dandliker | H04L 63/10 709/225 |
| 2008/0141376 A1 | 6/2008 | Clausen et al. | |
| 2009/0007102 A1* | 1/2009 | Dadhia | G06F 21/566 718/1 |
| 2011/0023115 A1 | 1/2011 | Wright | |
| 2011/0047594 A1 | 2/2011 | Mahaffey et al. | |
| 2011/0191342 A1* | 8/2011 | Cohen | G06Q 30/02 707/737 |
| 2012/0210422 A1 | 8/2012 | Huger et al. | |
| 2013/0185799 A1 | 7/2013 | Pfeifer et al. | |
| 2013/0298192 A1* | 11/2013 | Kumar | G06F 21/52 726/3 |
| 2014/0115703 A1 | 4/2014 | Michlin et al. | |
| 2015/0319261 A1* | 11/2015 | Lonas | H04L 67/2852 709/216 |
| 2016/0036833 A1 | 2/2016 | Ardeli et al. | |
| 2016/0080420 A1 | 3/2016 | Ray et al. | |
| 2016/0182550 A1 | 6/2016 | Spurlock et al. | |

OTHER PUBLICATIONS

European Patent Office, "International Application Serial No. PCT/GB2015/052656, Invitation to Pay Additional Fees and Partial Search Report dated Dec. 11, 2015", 8 pages.
USPTO, "U.S. Appl. No. 14/485,771 Non-Final Office Action dated Aug. 9, 2016", 19 pages.
USPTO, "U.S. Appl. No. 14/485,771, Final Office Action dated Apr. 28, 2017", 15 pages.
IPO, "UK Application No. 1705948.6 Examination Report dated Aug. 31, 2017", 1 pages.
USPTO, "U.S. Appl. No. 14/485,771 Notice of Allowance dated Feb. 1, 2018", 16 pages.

* cited by examiner

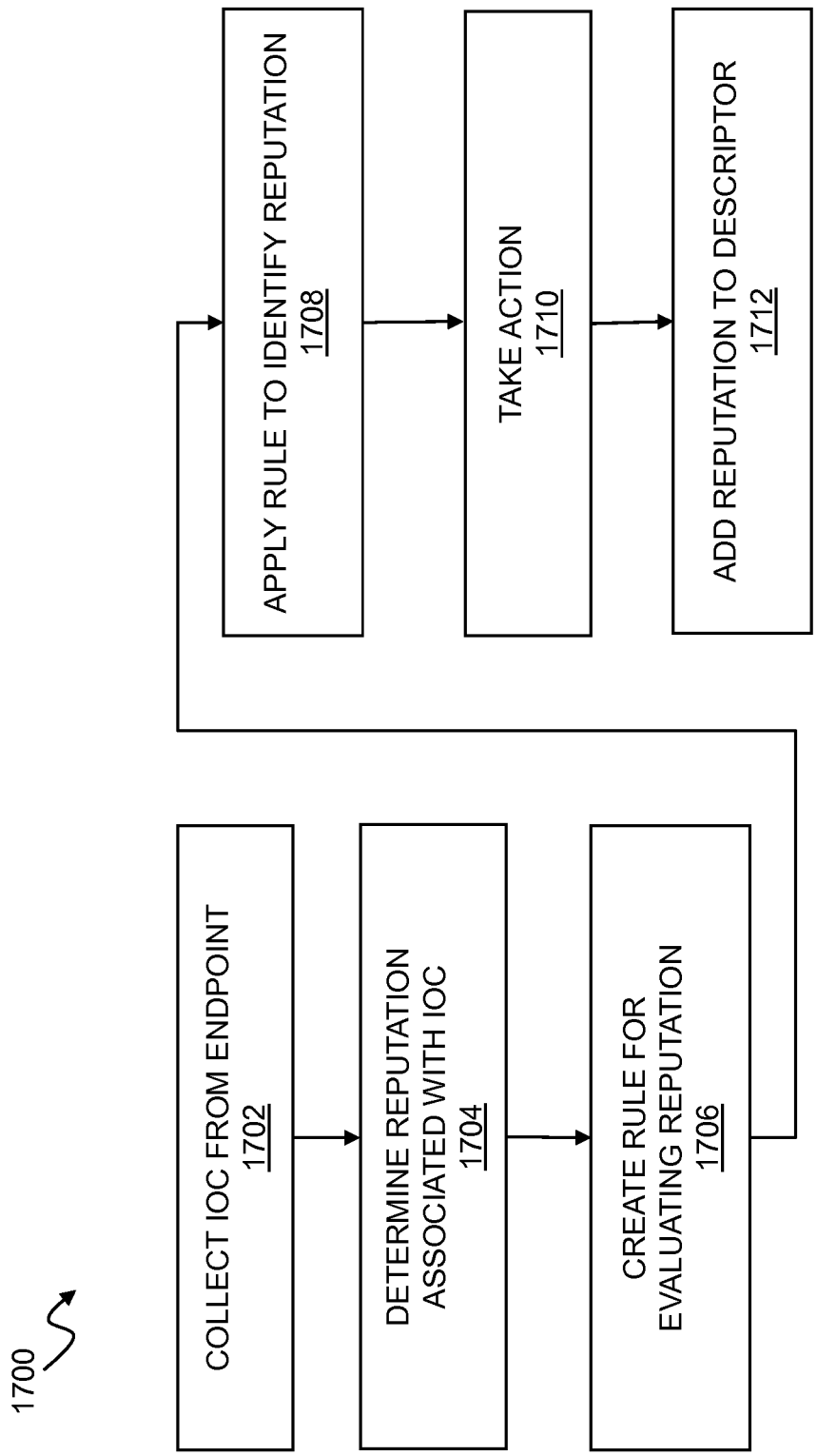

THREAT DETECTION USING A TIME-BASED CACHE OF REPUTATION INFORMATION ON AN ENTERPRISE ENDPOINT

RELATED APPLICATIONS

This application is related to the following commonly-owned U.S. patent applications each filed on Sep. 14, 2014 and each incorporated herein by reference in its entirety: U.S. patent application Ser. No. 14/485,759; U.S. patent application Ser. No. 14/485,762; U.S. patent application Ser. No. 14/485,765; U.S. patent application Ser. No. 14/485,769; U.S. patent application Ser. No. 14/485,771; U.S. patent application Ser. No. 14/485,774; and U.S. patent application Ser. No. 14/485,782.

TECHNICAL FIELD

This application relates to network security, and more specifically to threat detection using reputation scores for particular actions that expire after a predetermined time.

BACKGROUND

Antivirus and advanced persistent threat (APT) protection systems typically rely on platform-dependent attributes of various computing objects, or other detailed information about reputation, behavior, and the like. There remains a need for malware detection techniques that increase sensitivity to relevant events without requiring a corresponding increase in data storage and communications between an endpoint and a remote threat management facility.

SUMMARY

Instrumentation for threat detection is simplified by providing and updating labels for computing objects in a context-sensitive manner. This may include simple labeling schemes to distinguish between objects such as trusted and untrusted processes or corporate and private data. This may also or instead include more complex and granular labeling schemes such as a three-tiered scheme that identifies a category (e.g., financial, e-mail, game, etc.), static threat detection attributes (e.g., signatures, hashes, application calls, etc.), and explicit identification (e.g., what a file or process calls itself). By tracking such data for various computing objects and correlating these labels to malware occurrences, rules can be written for distribution to endpoints to facilitate threat detection based on, e.g., interactions of labeled objects, changes to object labels, and so forth. In this manner, threat detection based on complex interactions of computing objects can be characterized in a platform independent manner and pre-processed on endpoints without requiring significant communications overhead with a remote threat management facility.

In one aspect, a method includes processing an object on an endpoint; coloring the object in response to a first observed action with a descriptor of a context for the first observed action, the context including one or more attributes selected for a relevance to threat detection; applying a rule dependent on the descriptor in response to a second observed action of the object to detect a reportable event; and transmitting information to a threat management facility about the reportable event, the information including a description of the reportable event and the object along with the descriptor of the context.

Implementations may have one or more of the following features. The first observed action and the second observed action may be the same action. The object may include at least one of a process, a function, an executable, a dynamic linked library, a script, a file, a data structure, a URL, and data. The object may be a part of a process, wherein the object persists as long as the process is alive. The object may be a part of the endpoint, wherein the object persists as long as the endpoint is alive. The object may be a persistent object with persistence outside of the endpoint. The context may include one or more of a reputation of the object, an inferred behavior of the object, a source of the object, and a type of the object. The descriptor may include a reputation of the object. The descriptor may include a reputation of a second object associated with the first observed action. The descriptor may include a reputation of the object, the reputation selected based on a second reputation of a second object associated with the first observed action. The descriptor may include a reputation selected from a group consisting of good, bad, and unknown. The descriptor may include a reputation selected from a group consisting of in or out. The first observed action may include a behavior of the object and the descriptor is inferred based on the behavior. The context may include a type of the object. The object may include data, and wherein the descriptor includes an ownership of the object including one or more of private and corporate. The descriptor may include information about a network resource requested in the first observed action. The descriptor may include information about access to an unprotected object requested in the first observed action. The rule may compare information in the descriptor for the object with information in a second descriptor for one or more other objects associated with the second observed action. The rule may evaluate a consistency between the descriptor for the object and a second descriptor for one or more other objects associated with the second observed action. The rule may evaluate the descriptor for a change occurring to the descriptor during the second observed action. The method may further comprise identifying a threat based on the reportable event, and initiating a remedial action. The remedial action may be generating an alert, quarantining the endpoint, disabling communications by the endpoint, terminating one or more processes on the endpoint, or modifying a firewall rule for the endpoint. The method may further comprise recording a plurality of reportable events from the endpoint thereby providing an event history and identifying a threat based on the event history. The method may further comprise monitoring actions by a device, thereby providing a plurality of actions; determining a descriptor for each of the plurality of actions, thereby providing a plurality of descriptors; and automatically creating a rule for detecting a threat on the device based upon the plurality of descriptors for the device. The method may further comprise transmitting the rule to the endpoint. The rule may compare at least one of the plurality of descriptors to a known or expected descriptor to identify an inconsistency.

In another aspect, a computer program product comprising non-transitory computer executable code embodied in a non-transitory computer readable medium that, when executing on one or more computing devices, may perform the steps of: processing an object on an endpoint; coloring the object in response to a first observed action with a descriptor of a context for the first observed action, the context including one or more attributes selected for a relevance to threat detection; applying a rule dependent on the descriptor in response to a second observed action of the object to detect a reportable event; and transmitting information to a threat management facility about the reportable event, the information including a description of the reportable event and the object along with the descriptor of the context.

In yet another aspect, a system includes: a threat management facility configured to manage threats to an enterprise; and an endpoint of the enterprise having a processor and a memory, the memory storing an object, and the processor configured to process the object, to color the object in response to a first observed action with a descriptor of a context for the first observed action, the context including one or more attributes selected for a relevance to threat detection, to apply a rule dependent on the descriptor in response to a second observed action of the object to detect a reportable event, and to transmit information to the threat management facility about the reportable event, the information including a description of the reportable event and the object along with the descriptor of the context.

In one aspect, a method includes: collecting a plurality of behaviors of data on an endpoint using a monitoring facility thereby forming a plurality of collected behaviors; processing the plurality of collected behaviors to obtain a baseline of known behaviors; observing a specific behavior of the data on the endpoint using the monitoring facility; applying a rule in response to the specific behavior to detect a reportable event, the rule including a comparison to the baseline of known behaviors; and transmitting information to a threat management facility about the reportable event, the information including a description of the reportable event and the specific behavior.

Implementations may have one or more of the following features. The reportable event may include a deviation of the specific behavior from the baseline of known behaviors. The processing may include coloring the specific behavior with a descriptor of a context for the specific behavior, the context including one or more attributes selected for a relevance to threat detection. Applying the rule may identify an inconsistency in the descriptor for the specific behavior with other descriptors. The other descriptors may include a descriptor for a source of the specific behavior. The other descriptors may include a descriptor for a behavior included in the baseline of known behaviors. The reportable event may include the specific behavior exhibiting a similarity to a known or suspected malicious behavior. The method may further comprise storing the plurality of collected behaviors on a database. The specific behavior may include a movement of the data. The movement may include copying the data. The movement may include transmitting the data to a remote location. The specific behavior may include a change to the data implemented by a user. The specific behavior may include a change to the data implemented by an executable executing on the endpoint. The processing may include coloring the executable with a descriptor of a context inferred from the specific behavior. The rule may compare the descriptor of the executable with a descriptor of the data. The rule may compare a reputation of the data to a reputation of a process interacting with the data. The method may further comprise evaluating the reportable event at the threat management facility and generating an alert in response. The method may further comprise retaining a history of reportable events for the data. The method may further comprise observing a plurality of specific behaviors of the data and applying the rule to the plurality of specific behaviors to detect the reportable event.

In another aspect, a computer program product comprising non-transitory computer executable code embodied in a non-transitory computer readable medium that, when executing on one or more computing devices, may perform the steps of: collecting a plurality of behaviors of data on an endpoint using a monitoring facility thereby forming a plurality of collected behaviors; processing the plurality of collected behaviors to obtain a baseline of known behaviors; observing a specific behavior of the data on the endpoint using the monitoring facility; applying a rule in response to the specific behavior to detect a reportable event, the rule including a comparison to the baseline of known behaviors; and transmitting information to a threat management facility about the reportable event, the information including a description of the reportable event and the specific behavior.

In yet another aspect, a system includes: a threat management facility configured to manage threats to an enterprise; and an endpoint of the enterprise having a memory and a processor, the memory storing data, and the processor configured to collect a plurality of collected behaviors of the data, to process the plurality of collected behaviors to obtain a baseline of known behaviors, to observe a specific behavior of the data on the endpoint, to apply a rule in response to the specific behavior to detect a reportable event, the rule including a comparison to the baseline of known behaviors, and to transmit information to the threat management facility about the reportable event, the information including a description of the reportable event and the specific behavior.

In another aspect, a method includes: processing data on an endpoint; coloring the data in response to a first observed behavior with a descriptor of a context for the first observed behavior, the context including one or more attributes selected for a relevance to threat detection; applying a rule dependent on the descriptor in response to a second observed behavior of the data to detect a reportable event; and transmitting information to a threat management facility about the reportable event, the information including a description of the reportable event and the data along with the descriptor of the context.

In one aspect, a method includes: labeling each of a plurality of processes on an endpoint with a labeling scheme in which a process is either in, wherein the process conforms to a compliance policy administered for the endpoint from a remote threat management facility, or the process is out, wherein the process does not conform to the compliance policy, thereby providing a plurality of in processes and a plurality of out processes; labeling each of a plurality of files on the endpoint as either in, wherein the file is encrypted using a remotely managed key ring, or the file is out, wherein the file is not encrypted using the remotely managed key ring, thereby providing a plurality of in files and a plurality of out files; providing access to the remotely managed key ring by the plurality of in processes, thereby facilitating access to the plurality of in files by the plurality of in processes; changing a label for one of the plurality of processes from in to out in response to an observed action for the process, thereby providing a relabeled process; and revoking access by the relabeled process to the plurality of in files, thereby preventing the relabeled process from opening additional ones of the plurality of in files and preventing the relabeled process from creating a new in file.

Implementations may have one or more of the following features. Labeling the plurality of processes may include inferring a label for at least one of the plurality of processes based on a corresponding label of an associated executable. The method may further comprise monitoring at least one of the plurality of processes for compliance with the compliance policy. Monitoring for compliance may include monitoring an action of the at least one of the plurality of processes. The action may include an interaction of the at least one of the plurality of processes with one or more other ones of the plurality of processes. Labeling the plurality of files may include inferring a label for at least one of the plurality of files based on a corresponding label of a process that created the one of the plurality of files. Labeling the plurality of files may include inferring a label for at least one of the plurality of files based on a corresponding label of a process that accessed the one of the plurality of files. The method may further comprise denying access to the remotely managed key ring by the plurality of out processes, thereby denying access to the plurality of in files by the plurality of out processes. The observed action for the process may include exposure to an object external to the endpoint. The external object may include at least one of data, a URL, an external process, and an external file. The external object may be known to be or suspected to be malicious. A security status of the external object may be unknown. The observed action for the process may include exposure to an object labeled as out. The observed action for the process may include exposure to an object with a poor reputation. The method may further comprise changing a label for one of the plurality of files from in to out. The method may further comprise changing a label for one of the plurality of files from out to in. Revoking access may occur when the observed action for the process deviates from an expected action. The method may further comprise managing use of the key ring to control access to the plurality of files with a file system for the endpoint. The method may further comprise coupling a data loss prevention system to an endpoint protection system for an endpoint in an enterprise by labeling files as in or out on the endpoint according to compliance with an endpoint policy.

In another aspect, a computer program product comprising non-transitory computer executable code embodied in a non-transitory computer readable medium that, when executing on one or more computing devices, may perform the steps of: labeling each of a plurality of processes on an endpoint with a labeling scheme in which a process is either in, wherein the process conforms to a compliance policy administered for the endpoint from a remote threat management facility, or the process is out, wherein the process does not conform to the compliance policy, thereby providing a plurality of in processes and a plurality of out processes; labeling each of a plurality of files on the endpoint as either in, wherein the file is encrypted using a remotely managed key ring, or the file is out, wherein the file is not encrypted using the remotely managed key ring, thereby providing a plurality of in files and a plurality of out files; providing access to the remotely managed key ring by the plurality of in processes, thereby facilitating access to the plurality of in files by the plurality of in processes; changing a label for one of the plurality of processes from in to out in response to an observed action for the process, thereby providing a relabeled process; and revoking access by the relabeled process to the plurality of in files, thereby preventing the relabeled process from opening additional ones of the plurality of in files and preventing the relabeled process from creating a new in file.

In another aspect, a system may include: a threat management facility configured to manage threats to an enterprise, the threat management facility including a compliance policy for endpoints in the enterprise; a key management system to remotely manage a key ring for cryptographic processing in the enterprise; and an endpoint associated with the enterprise including a processor and a memory, the memory storing a plurality of processes and a plurality of files, and the processor configured to label each of the plurality of processes on the endpoint with a labeling scheme in which a process is either in, wherein the process conforms to the compliance policy, or the process is out, wherein the process does not conform to the compliance policy thereby providing a plurality of in processes and a plurality of out processes, to label each of the plurality of files on the endpoint as either in, wherein the file is encrypted using the key ring, or the file is out, wherein the file is not encrypted using the key ring thereby providing a plurality of in files and a plurality of out files, to provide access to the key ring by the plurality of in processes thereby facilitating access to the plurality of in files by the plurality of in processes, to change a label for one of the plurality of processes from in to out in response to an observed action for the process, thereby providing a relabeled process, and to revoke access by the relabeled process to the plurality of in files, thereby preventing the relabeled process from opening additional ones of the plurality of in files and preventing the relabeled process from creating a new in file.

In one aspect, a method includes: labeling objects on an endpoint with a labeling scheme in which the objects are either in, wherein the objects conform to a compliance policy administered for the endpoint from a remote threat management facility, or the objects are out, wherein the objects do not conform to the compliance policy, thereby providing a plurality of in objects and a plurality of out objects, the objects including at least one of processes, files, and data; providing in objects of the endpoint access to encrypted files using a key ring that is remotely managed; detecting a compromise of the endpoint; and in response to detecting the compromise, deleting key material cached on the endpoint from the key ring, thereby revoking access to the encrypted files by the endpoint.

Implementations may have one or more of the following features. The objects may include a URL. The method may further comprise monitoring at least one of the objects for compliance with the compliance policy. The monitoring for compliance may include monitoring a behavior of the at least one of the objects. The behavior may include an interaction with one or more other objects on the endpoint. The method may further comprise monitoring at least one of the encrypted files for compliance with the compliance policy. Detecting the compromise of the endpoint may include receiving an indication of compromise (IOC). An external monitoring facility may detect the compromise of the endpoint. The external monitoring facility may send a signal to the endpoint to set itself into a state of compromise when the compromise is detected. An internal monitoring facility on the endpoint may detect the compromise of the endpoint. Detecting the compromise of the endpoint may include receiving an IOC pattern from the endpoint indicative of a compromised state. Detecting the compromise of the endpoint may be based on at least one of: behavioral analysis, malware signature analysis, reputation, and access to a remote command and control resource. The compromise may include exposure of at least one of the plurality of in objects to an external object. The external object may include at least one of: data, a URL, an external process, and an external file. The external object may be known or suspected to be malicious. A security status of the external object may be unknown.

In another aspect, a computer program product comprising non-transitory computer executable code embodied in a non-transitory computer readable medium that, when executing on one or more computing devices, performs the steps of: labeling objects on an endpoint with a labeling scheme in which the objects are either in, wherein the objects conform to a compliance policy administered for the endpoint from a remote threat management facility, or the objects are out, wherein the objects do not conform to the compliance policy, thereby providing a plurality of in objects and a plurality of out objects, the objects including at least one of processes, files, and data; providing in objects of the endpoint access to encrypted files using a key ring that is remotely managed; detecting a compromise of the endpoint; and in response to detecting the compromise, deleting key material cached on the endpoint from the key ring, thereby revoking access to the encrypted files by the endpoint.

In yet another aspect, a system includes a threat management facility configured to manage threats to an enterprise, the threat management facility maintaining a compliance policy for endpoints in the enterprise; a key management system to remotely manage a key ring for cryptographic processing in the enterprise; and an endpoint associated with the enterprise having a memory and a processor, the memory storing key material from the key ring and a plurality of objects including at least one of processes, files, and data, and the processor configured to label the objects with a labeling scheme in which the objects are either in, wherein the objects conform to the compliance policy, or the objects are out, wherein the objects do not conform to the compliance policy, thereby providing a plurality of in objects and a plurality of out objects, to provide in objects of the endpoint access to encrypted files using the key material from the key ring, to detect a compromise of the endpoint, and in response to detecting the compromise, to delete the key material from the key ring cached in the memory on the endpoint, thereby revoking access to the encrypted files by the endpoint.

In one aspect, a method may include: providing an application firewall configured to provide conditional, rule-based access to network resources by an application executing on an endpoint; processing the application on the endpoint; coloring the application in response to a first observed action with a descriptor of a context for the first observed action, the context including one or more attributes selected for a relevance to threat detection; applying a rule dependent on the descriptor in response to a second observed action of the application to detect a reportable event; and limiting access by the application to a network resource with the application firewall based on the reportable event.

Implementations may have one or more of the following features. The method may further comprise applying firewall rules based on a reputation of the application when the application launches. The method may further comprise changing an access rule for the endpoint based upon the reportable event. The endpoint may be a web server or a client device. The rule may depend on a plurality of observed actions on the endpoint. The application firewall may be included on the endpoint, on a destination server, or as part of a routing of the network. The descriptor may include a category for an object, static threat detection information for the object, and a specific identifier of the object. The object may be the application or an item accessed by the application.

In another aspect a computer program product comprising non-transitory computer executable code embodied in a non-transitory computer readable medium that, when executing on one or more computing devices, performs the steps of: providing an application firewall on an endpoint configured to provide conditional, rule-based access to network resources by an application executing on the endpoint; processing the application on the endpoint; coloring the application in response to a first observed action with a descriptor of a context for the first observed action, the context including one or more attributes selected for a relevance to threat detection; applying a rule dependent on the descriptor in response to a second observed action of the application to detect a reportable event; and limiting access by the application to the network resource with the application firewall based on the reportable event.

In yet another aspect, a system includes: an application firewall configured to provide conditional, rule-based access to network resources by applications executing on endpoints in an enterprise; and an endpoint of the enterprise having a processor and a memory, the memory storing an application executing on the endpoint, and the processor configured to process the application on the endpoint, to color the application in response to a first observed action with a descriptor of a context for the first observed action, the context including one or more attributes selected for a relevance to threat detection, to apply a rule dependent on the descriptor in response to a second observed action of the application to detect a reportable event, and to limit access by the application to the network resource with the application firewall based on the reportable event.

In another aspect, a method includes: providing a firewall on a gateway configured to provide conditional, rule-based access from an endpoint on a first network on one interface of the gateway to a network resource on a second network on another interface of the gateway; processing an object on the endpoint; coloring the object in response to a first observed action with a descriptor of a context for the first observed action, the context including one or more attributes selected for a relevance to threat detection; applying a rule dependent on the descriptor in response to a second observed action of the object to detect a reportable event; changing an access rule at the gateway for the endpoint based upon the reportable event; and limiting access by the object to the network resource with the firewall based on the reportable event.

In one aspect, a method includes: detecting an action at an endpoint; transmitting an indication of compromise to a remote threat management facility, the indication of compromise including a description of the action having an identifier of a process that took the action and an object associated with the action; receiving from the remote threat management facility a reputation score for the action and a time to live for the action; and caching the description and the reputation score in an event cache on the endpoint for a duration equal to the time to live.

Implementations may have one or more of the following features. The method may further comprise collecting a plurality of descriptions of a plurality of actions on the endpoint into the indication of compromise for transmitting to the remote threat management facility for retrieval of a corresponding reputation score and time to live. The method may further comprise detecting a plurality of actions on the endpoint and accumulating a sequence of the plurality of actions in the event cache that have not expired into the indication of compromise for communication to the threat management facility. The object may include a URL accessed by the action or a filename accessed by the action. The method may further comprise taking a remedial action at the endpoint when malicious activity is detected. The reputation score may be based on a geographical distribution of the description on a plurality of endpoints or a number of prior occurrences of the description on a plurality of endpoints.

In another aspect, a computer program product comprising non-transitory computer executable code embodied in a non-transitory computer readable medium that, when executing on one or more computing devices, performs the steps of: detecting an action at an endpoint; transmitting an indication of compromise to a remote threat management facility, the indication of compromise including a description of the action having an identifier of a process that took the action and an object associated with the action; receiving from the remote threat management facility a reputation score for the action and a time to live for the action; and caching the description and the reputation score in an event cache on the endpoint for a duration equal to the time to live.

In yet another aspect, a system may include: a threat management facility configured to manage threats to an enterprise; and an endpoint of the enterprise having a memory and a processor, the memory storing an object and a process, and the processor configured to detect an action at the endpoint, to transmit an indication of compromise to a remote threat management facility, the indication of compromise including a description of the action having an identifier of the process that took the action and the object associated with the action, to receive from the threat management facility a reputation score for the action and a time to live for the action, and to cache the description and the reputation score in an event cache on the endpoint for a duration equal to the time to live.

In one aspect, a method includes: detecting an action on an endpoint; normalizing the action into a normalized action expressed independently from a hardware and software platform of the endpoint, thereby providing a normalized action; creating an observation for the normalized action using a predetermined schema that organizes the observation into a first identifier of an object associated with the action, a second identifier of the normalized action, and one or more descriptors that characterize the observation with information selected for relevance to threat detection; collecting a plurality of observations for the endpoint and a relationship among the plurality of observations; and applying a rule to identify a reportable event based on the plurality of observations and the relationship.

Implementations may have one or more of the following features. The relationship among at least two of the plurality of observations may be defined by a first normalized action associated with a first object and a second object that receives the first normalized action. The second object may include one or more additional normalized actions each having an additional object thereof. One of the plurality of observations may have a time-to-live that provides an amount of time after which the one of the plurality of observations expires. The observation may include one or more other normalized actions each having a child object depending therefrom. The object may include a normalized object expressed in a manner independent from the hardware and software of the endpoint. The descriptor may include a reputation of the object or static threat detection data for the object. The static threat detection data may include one or more of a hash of the object, a signature of the object, and a file size of the object or it may include a reference to a data repository of threat detection information. The data repository may be on the endpoint or outside of the endpoint. At least one of the descriptor or the first identifier of the object may include a name of the object as provided by the object. The object may include one or more of a process, a function, an executable, a dynamic linked library, a script, a file, a data structure, a URL, and data.

In another aspect, a computer program product comprising non-transitory computer executable code embodied in a non-transitory computer readable medium that, when executing on one or more computing devices, performs the steps of: detecting an action on an endpoint; normalizing the action into a normalized action expressed independently from a hardware and software platform of the endpoint, thereby providing a normalized action; creating an observation for the normalized action using a predetermined schema that organizes the observation into a first identifier of an object associated with the action, a second identifier of the normalized action, and one or more descriptors that characterize the observation with information selected for relevance to threat detection; collecting a plurality of observations for the endpoint and a relationship among the plurality of observations; and applying a rule to identify a reportable event based on the plurality of observations and the relationship.

In yet another aspect, a method includes a threat management facility configured to manage threats to an enterprise; and an endpoint of the enterprise having a processor and a memory, the memory storing an object associated with an action, and the processor configured to detect the action, to normalize the action into a normalized action expressed independently from a hardware and software platform of the endpoint thereby providing a normalized action, to create an observation for the normalized action using a predetermined schema that organizes the observation into a first identifier of the object, a second identifier of the normalized action, and one or more descriptors that characterize the observation with information selected for relevance to threat detection, to collect a plurality of observations for the endpoint and a relationship among the plurality of observations, and to apply a rule to identify a reportable event based on the plurality of observations and the relationship.

In one aspect, a method includes: collecting a plurality of indications of compromise from an endpoint, each one of the indications of compromise based upon one or more actions on the endpoint and one or more descriptors and objects related thereto; determining a reputation associated with the plurality of indications of compromise based upon a context for the one or more actions on the endpoint; and creating a rule for evaluating reputation based upon an occurrence of the plurality of indications of compromise.

Implementations may have one or more of the following features. The method may further comprise applying the rule to identify the reputation based on the occurrence of the plurality of indications of compromise. The one or more descriptors may include a specific identification of one of the objects, a genetic identification of one of the objects based one or more characteristics or actions of the object, or a category of one of the objects. The category may include a reputation or an application type.

In another aspect, a method includes: collecting a plurality of indications of compromise from an endpoint, each one of the indications of compromise based upon one or more actions on the endpoint and one or more descriptors and objects related thereto; determining a reputation for the plurality of indications of compromise based upon a rule derived from a context of one or more previously obtained collections of indications of compromise; and taking an action based upon the reputation.

Implementations may have one or more of the following features. Taking an action may include initiating a remedial action for the endpoint. The method may further comprise adding the reputation to one of the descriptors for one of the objects on the endpoint.

In yet another aspect, a computer program product comprising non-transitory computer executable code embodied in a non-transitory computer readable medium that, when executing on one or more computing devices, performs the steps of: collecting a plurality of indications of compromise from an endpoint, each one of the indications of compromise based upon one or more actions on the endpoint and one or more descriptors and objects related thereto; determining a reputation associated with the plurality of indications of compromise based upon a context for the one or more actions on the endpoint; and creating a rule for evaluating reputation based upon an occurrence of the plurality of indications of compromise.

In another aspect, a system includes: a threat management facility configured to manage threats to an enterprise; and an endpoint of the enterprise having a processor and a memory, the memory storing one or more objects associated with one or more actions, and the processor configured to collect a plurality of indications of compromise from the endpoint, each one of the indications of compromise based upon the one or more actions on the endpoint and one or more descriptors and the objects related thereto, to determine a reputation associated with the plurality of indications of compromise based upon a context for the one or more actions on the endpoint, and to create a rule for evaluating reputation based upon an occurrence of the plurality of indications of compromise.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 17 is a flowchart of a method for detecting IOCs.

DETAILED DESCRIPTION

Figure 1:
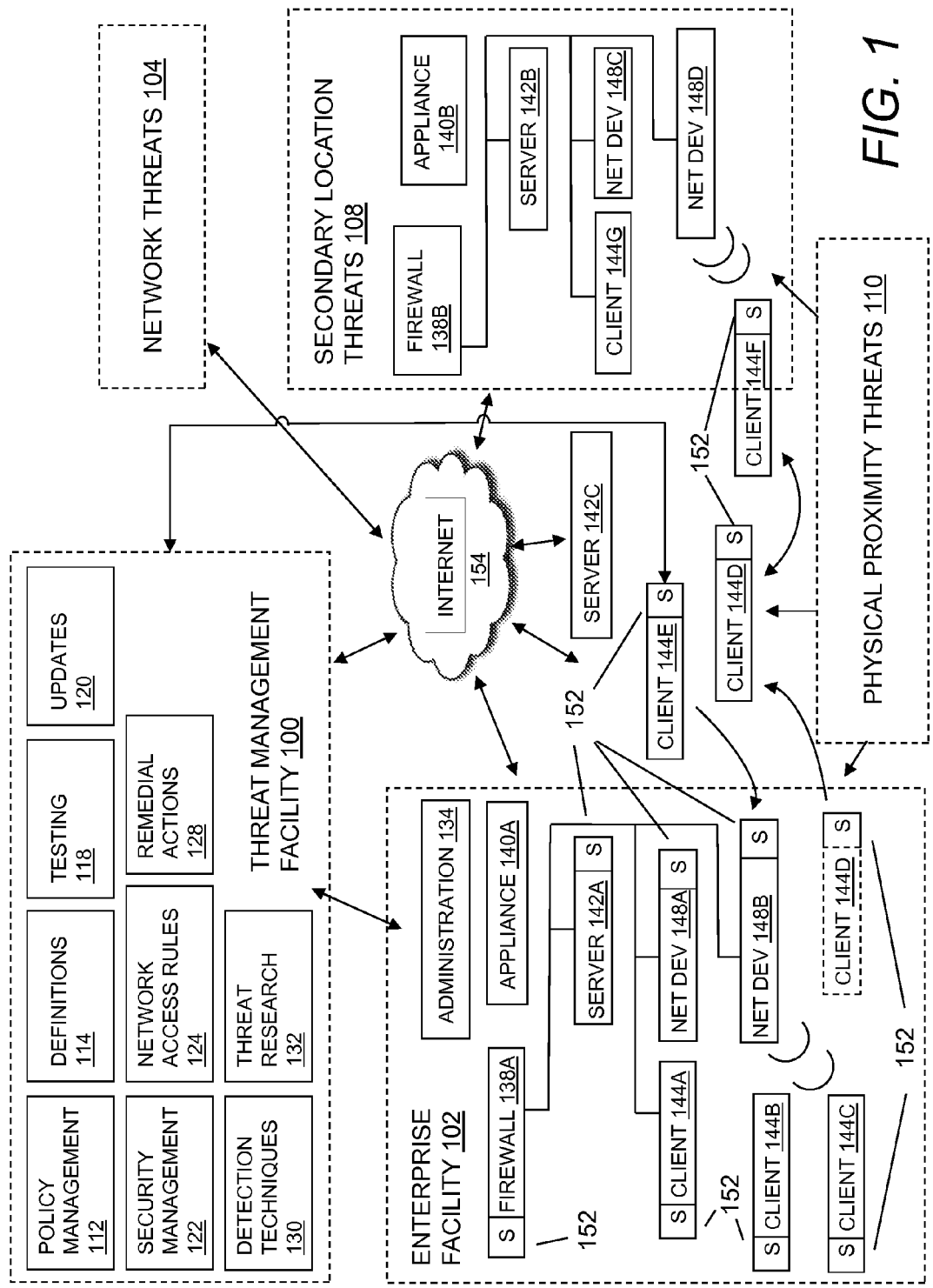
FIG. 1 illustrates an environment for threat management.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "above," "below," and the like, are words of convenience and are not to be construed as limiting terms unless expressly state otherwise.

While techniques described herein may emphasize certain threat management techniques such as the detection (and, in some instances remediation) of advanced persistent threats (APTs) that can be manually and remotely controlled through a remote command and control infrastructure, it will be appreciated that the disclosed systems and methods are more generally applicable in a wide variety of threat management contexts including malware, viruses, and the like that might not be classified as APTs. For example, the disclosed systems and methods are applicable to targeted attacks, e.g., attacks that are directly controlled by an adversary or that are run remotely by semiautonomous or fully autonomous software with the intention being to breach, attack, penetrate, etc., the security put in place to protect assets and maintain the integrity of systems protected. Thus, references to APTs or other threats throughout this document should be understood to also refer to any threat or other malware or the like that might be usefully remediated using the techniques described herein. More generally, the scope of this disclosure is not limited by the context and examples provided herein, but is intended to include any other adaptations or uses of the disclosed techniques for enterprise security that might be apparent to one of ordinary skill in the art.

An environment for threat management where the devices, systems, and methods discussed herein may be utilized will now be described.

FIG. 1 illustrates an environment for threat management. Specifically, FIG. 1 depicts a block diagram of a threat management system providing protection to an enterprise against a plurality of threats. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the Internet 154. From both technical and user perspectives, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at least one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be standalone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach end-point computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities, or the like. In an embodiment, the management of malicious code information may be provided to the enterprise facility's 102 network, where the enterprise facility's 102 network may provide the malicious code information through the enterprise facility's 102 network distribution system.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict instant messaging (IM) activity to only support personnel for communicating with customers. This may allow communication for departments requiring access, but may maintain the network bandwidth for other activities by restricting the use of IM to only the personnel that need access to IM in support of the enterprise facility 102. In an embodiment, the policy management facility 112 may be a stand-alone application, may be part of the network server facility 142, may be part of the enterprise facility 102 network, may be part of the client facility, or the like.

In embodiments, the threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services which are provided indirectly through a third-party product, the application may be suspended until action is taken to remove or disable the third-party product's protection facility.

Threat management against a sometimes quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility, the enterprise facility 102 network and/or client facility may pull information from the security facility 122 and policy management facility 112 network server facilities 142, there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

In an embodiment, a definition management facility 114 may provide for the timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility application should be granted access to a requested network location. The network location may be on the same network as the facility or may be on another network. In an embodiment, the network access control may verify access rights for client facilities from within the network or may verify access rights of computer facilities from external networks. When network access for a client facility is denied, the network access control may send an information file to the client facility, the information file may contain data or commands that may provide instructions for the remedial action facility 128. The information sent by the network access facility 124 control may be a data file. The data file may contain a number of commands, definitions, instructions, or the like to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or end-point devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits, a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the end-point computer security facility 152, located on a computer's desktop, which may provide threat protection to a user, and associated enterprise facility 102. In embodiments, the term end-point may refer to a computer system that may source data, receive data, evaluate data, buffer data, or the like (such as a user's desktop computer as an end-point computer), a firewall as a data evaluation end-point computer system, a laptop as a mobile end-point computer, a PDA or tablet as a hand-held end-point computer, a mobile phone as an end-point computer, or the like. In embodiments, end-point may refer to a source or destination for data, including such components where the destination is characterized by an evaluation point for data, and where the data may be sent to a subsequent destination after evaluation. The end-point computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the end-point computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the end-point computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURL Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated end-point computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an end-point computer security facility 152. These appliances may provide interconnection services within the enterprise facility 102 network, and therefore may advance the spread of a threat if not properly protected.

One way for a client facility to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an end-point computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network". Since firewall facilities 138 represent boundaries between threat levels, the end-point computer security facility 152 associated with the firewall facility 138 may provide resources that may control the flow of threats at this enterprise facility 102 network entry point. Firewall facilities 138, and associated end-point computer security facility 152, may also be associated with a network node that may be equipped for interfacing between networks that use different protocols. In embodiments, the end-point computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop end-point computer security facility 152.

The interface between the threat management facility 100 and the enterprise facility 102, and through the appliance facility 140 to embedded end-point computer security facilities, may include a set of tools that may be the same for all enterprise implementations, but allow each enterprise to implement different controls. In embodiments, these controls may include both automatic actions and managed actions. Automatic actions may include downloads of the end-point computer security facility 152 to components of the enterprise facility 102, downloads of updates to existing end-point computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same end-point computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144 B-F), if not for the presence of the end-point computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144 D-F) that has an embedded end-point computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile client facilities may receive the same interactions to and from the threat management facility 100 as client facilities inside the enterprise facility 102, where the mobile client facilities may be considered a virtual extension of the enterprise facility 102, receiving all the same services via their embedded end-point computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the end-point computer security facility 152 equipped components of the enterprise facility 102. In turn the end-point computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an end-point computer security facility 152, but in embodiments, as long as the mobile client facility is embedded with an end-point computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 end-point computer security facility 152 may manage actions in unprotected network environments such as when the client facility (e.g., client 144F) is in a secondary location 108 or connecting wirelessly to a non-enterprise facility 102 wireless Internet connection, where the end-point computer security facility 152 may dictate what actions are allowed, blocked, modified, or the like. For instance, if the client facility's 144 end-point computer security facility 152 is unable to establish a secured connection to the threat management facility 100, the end-point computer security facility 152 may inform the user of such, and recommend that the connection not be made. In the instance when the user chooses to connect despite the recommendation, the end-point computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the end-point computer security facility 152 may perform specific actions to remediate possible threat incursions or policy violations during or after the unprotected connection.

The secondary location 108 may have no end-point computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a BLUETOOTH connection (a connection based on a wireless technology standard available from Bluetooth SIG, Inc. of Kirkland, Wash.). These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the end-point computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

In general, the devices, systems, and methods discussed herein may implement a variety of threat management techniques such as those described in U.S. patent application Ser. No. 14/263,955 filed on Apr. 28, 2014 (Advanced Persistent Threat Detection) and U.S. patent application Ser. No. 13/658,977 filed on Oct. 24, 2012 (Threat Detection through the Accumulated Detection of Threat Characteristics). The content of each of these applications is hereby incorporated by reference in its entirety.

Having provided an overall context for threat detection, the description now turns to behavioral tracking, coloring, and the generation of indications of compromise (IOCs).

Figure 2:
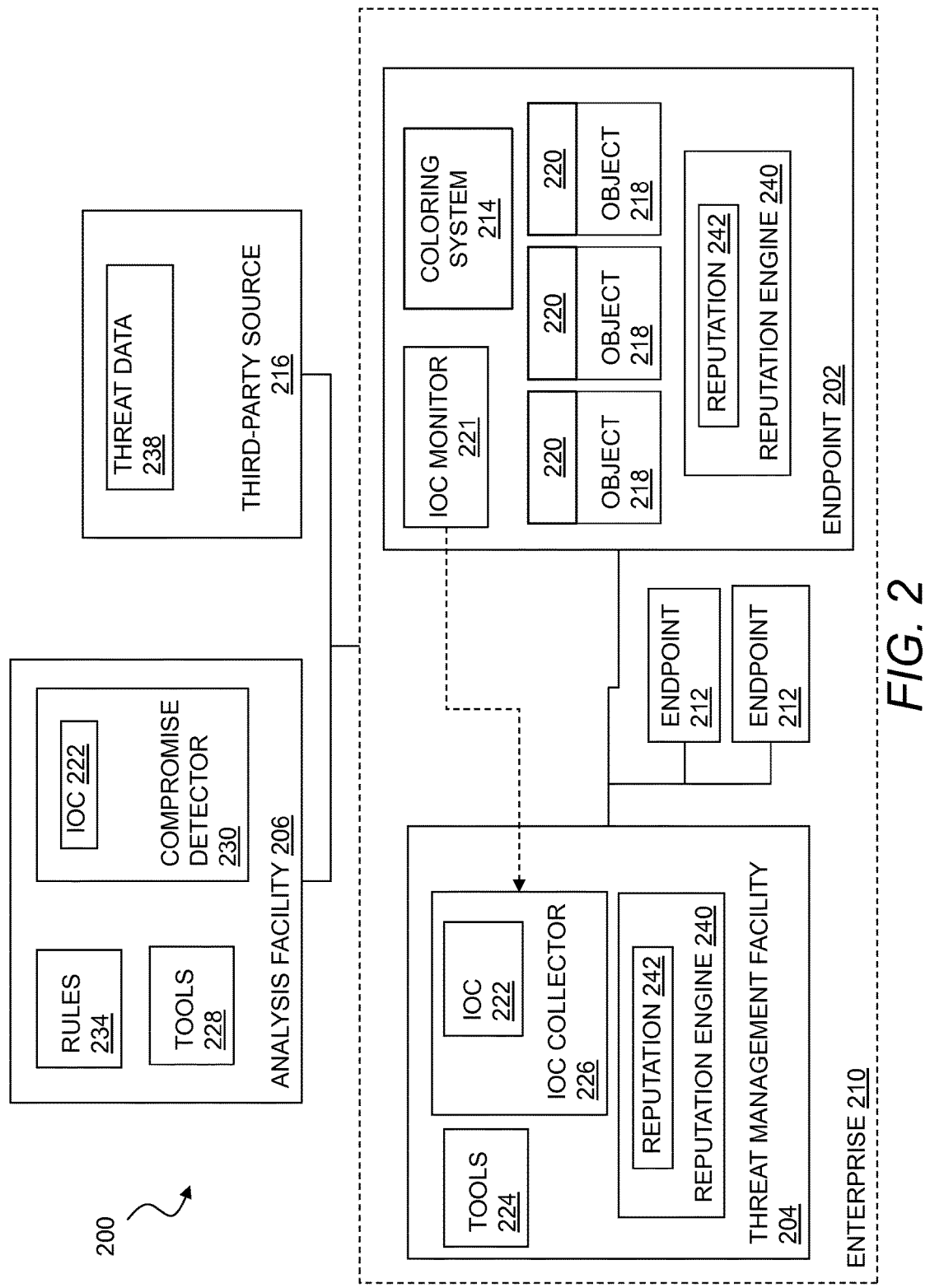
FIG. 2 illustrates a system for behavioral tracking, coloring, and generation of indications of compromise (IOCs).

FIG. 2 illustrates a system for threat management as contemplated herein. In general, the system 200 may include a number of entities participating in a threat management process. The threat management process may for example include any of the techniques described herein such as techniques for behavioral tracking, IOC normalization and generalization, encryption, endpoint recording, URL caching, IN/OUT encryption, IOC and reputation-based threat detection, behavioral-based key shredding, application firewalls, generating and utilizing reputations for IOC streams, and any other suitable techniques for detecting and managing threats to endpoints in an enterprise.

In general, the system 200 may include a number of endpoints 202, 212 and a threat management facility 204 in an enterprise 210, such as any of the enterprises described above. An external analysis facility 206 may analyze threat data and provide rules and the like for use by the threat management facility 204 and endpoints 202, 212 in managing threats to the enterprise 210. The threat management facility 204 may reside in a local appliance, a virtual appliance (e.g., which could be run by a protected set of systems on their own network systems), a private cloud, a public cloud, and so forth. The analysis facility 206 may also receive threat information from a third party source 216 such as MITRE Corporation or any other public, private, educational or other organization that gathers information on network threats and provides analysis and threat detection information for use by others. Each of these components may be configured with suitable programming to participate in the various threat detection and management techniques contemplated herein. The management facility 204 may monitor any stream of data from an endpoint 202 exclusively, or use the full context of intelligence from the stream of all protected endpoints 202 or some combination of these.

The endpoint 202 may be any of the endpoints described herein, or any other device or network asset that might join or participate in the enterprise 210 or otherwise on an enterprise network. This may, for example, include a server, a client such as a desktop computer or a mobile computing device (e.g., a laptop computer or a tablet), a cellular phone, a smart phone, or other computing device suitable for participating in the enterprise 210.

In general, the endpoint 202 may include any number of computing objects such as an object 218 labeled with a descriptor 220. While the term object has a number of specific meanings in the art, and in particular in object-oriented programming, it will be understood that the term 'object' as used herein is intended to be significantly broader, and may include any data, process, or combination of these including without limitation any process, application, executable, script, dynamic linked library, file, data, database, data source, data structure, function, resource locator (e.g., uniform resource locator (URL) or other uniform resource identifier (URI)), and so forth.

An object 218 may also or instead include a remote resource, such as a resource identified in a URL. That is, while the objects 218 in FIG. 2 are depicted as residing on the endpoint 202, an object 218 may also reside elsewhere in the system 200, while still being labeled with a descriptor 220 and tracked by the monitor 221 of the endpoint 202 as contemplated herein. The object 218 may be an item that is performing an action or causing an event, or the object 218 may be an item that is receiving the action or result of an event (i.e., the item in the system 200 being acted upon).

Where the object 218 is data or includes data, the object 218 may be encrypted or otherwise protected, or the object 218 may be unencrypted or otherwise unprotected. The object 218 may be a process or other computing object that performs an action, which may include a single event or a collection or sequence of events taken by a process. The object 218 may also or instead include a computing component upon which an action is taken, e.g., a system setting (e.g., a registry key or the like), a data file, a URL, or the like. The object 218 may exhibit a behavior such as an interaction with another object or component of the system 200.

In one aspect, objects 218 may be described in terms of persistence. The object 218 may, for example, be a part of a process, and remain persistent as long as that process is alive. The object 218 may instead be persistent across an endpoint 202 and remain persistent as long as an endpoint 202 is active or alive. The object 218 may instead be a global object having persistence outside of an endpoint 218, such as a URL. In other words, the object 218 may be a persistent object with persistence outside of the endpoint.

Although many if not most objects 218 will typically be benign objects forming a part of a normal, operating endpoint, an object 218 may contain software associated with an advanced persistent threat (APT) or other malware that resides on the endpoint 202. The associated software may have reached the endpoint 202 in a variety of ways, and may have been placed manually or automatically on the endpoint 202 by a malicious source. It will be understood that the associated software may take any number of forms and have any number of components. For example, the associated software may include an executable file that can execute independently, or the associated software may be a macro, plug-in, or the like that executes within another application. Similarly, the associated software may manifest as one or more processes or threads executing on the endpoint 202. Further, the associated software may install from a file on the endpoint 202 (or a file remote from the endpoint 202), and the associated software may create one or more files such as data files or the like while executing. Associated software should be understood to generally include all such files and processes except where a specific file or process is more specifically noted.

An APT may also take the form of an attack where no altered or additional software is directly added or modified on the endpoint 202. Instead, an adversary may reuse existing software on the system 200 to perform the attacks. It is for this reason that simply scanning for associated software may be insufficient for the detection of APTs and instead behavior of the software and associated objects 218 that are used by, for, and with that software may be desired for detection of APTs.

An object coloring system 214 may apply descriptors 220 to objects 218 on the endpoint 202. This may be performed continuously by a background process on the endpoint 202, or it may occur whenever an object 218 is involved in an action, such as when a process makes a call to an application programming interface (API) or takes some other action, or when a URL is used to initiate a network request, or when data in a file is read from or written to. This may also or instead include a combination of these approaches as well as other approaches, such as by pre-labeling a file or application when it is moved to the endpoint 202, or when the endpoint 202 is started up or instantiated.

As noted above, the term 'object' as used herein is intended to include a wide range of computing objects and as such the manner in which particular objects 218 are labeled or 'colored' with descriptors 220 may vary significantly. Any object 218 that is performing an action may be colored at the time of and/or with a label corresponding to the action, or likewise any object 218 that is the target of the action may be colored at the time that it is used and/or with a label corresponding to a process or the like using the object 218. Furthermore, the operating system runtime representation of the object 218 may be colored, or the persistent object outside of the operating system may be colored (as is the case for a File Handle or File Object within the operating system or the actual file as stored in a file system), such as within an encryption header or other header applied to the file, or as part of a directory attribute or any other persistent location within the file or file system. A former coloring may be ephemerally tracked while the operating system maintains the representation and the latter may persist long after any reboots of the same operating system and likewise have meaning when read or used by other endpoints 202. For processes, each file handle may be supplemented with a pointer or other mechanism for locating a descriptor 220 for a particular object 220 that is a process. More specifically, each object 218 may be colored in any manner suitable for appending information to that object 218 so that the corresponding descriptor 220 can be retrieved and, where appropriate, updated.

The coloring system 214 may apply any suitable rules for adding and changing descriptors 220 for objects 218. For example, when a process with a certain descriptor accesses data with a different descriptor, the descriptor for the process may be updated to correspond to the data, or the descriptor for the data may be updated to correspond to the process, or some combination of these. Any action by or upon an object 218 may trigger a coloring rule so that descriptors 220 can be revised at any relevant time(s) during processing.

A descriptor 220 may take a variety of forms, and may in general include any information selected for relevance to threat detection. This may, for example, be a simple categorization of data or processes such as trusted or untrusted. For example, in one embodiment described herein, data and processes are labeled as either 'IN' (e.g., trusted) or 'OUT' (e.g., untrusted). The specific content of the label is unimportant, and this may be a binary flag, text string, or other human-readable and/or machine-readable identifier, provided that the descriptor 220 can facilitate discrimination among labeled files—in this example, between trusted objects 218 and untrusted objects 218 so that, e.g., trusted data can be selectively encrypted and exposed to trusted processes. Similarly, data may be labeled as corporate data or private data, with similar type-dependent processing provided. For example, private data may be encrypted with a key exclusively controlled by the data owner, while corporate data may be encrypted using a remotely managed key ring for an enterprise operated by the corporation.

In another aspect, the descriptor 220 may provide a multi-tiered or hierarchical description of the object 218 including any information useful for characterizing the object 218 in a threat management context. For example, in one useful configuration the descriptor 220 may include a type or category, static threat detection attributes, and an explicit identification. The type or category for the object 218 may be any category or the like that characterizes a general nature or use of the object 218 as inferred from behavior and other characteristics. This may, for example, include categories such as 'game,' 'financial,' 'application,' 'electronic mail,' 'image,' 'video,' 'browser,' 'antivirus,' and so forth. The category may be more granular, or may include hierarchical categories such as 'application:spreadsheet,' 'application:word_processing,' and so forth. Such colors may be directly inferred from a single action, a sequence of actions, or a combination of actions and other colors, including, e.g., colors of processes and files related to a particular action, or other objects 218 that provide context for a particular action or group of actions.

The static threat detection attributes may be any readily ascertainable characteristics of the object 218 useful in threat detection. This may, for example, include an antivirus signature, a hash, a file size, file privileges, a process user, a path or director, and so forth. Static threat detection attributes may also include attributes that are derived by or supplied from other sources. For example, static threat detection attributes may include a reputation for an object 218, which may be expressed in any suitable or useful level of granularity such as with discrete categories (trusted/untrusted/unknown) or with a numerical score or other quantitative indicator. The explicit identification is in general what an object 218 calls itself, e.g., a file name or process name.

Some actions may transfer colors from the subject of the action to the target of the action. For example, when a process creates sub-processes, the sub-processes may inherit the colors of its parents. By way of another example, when a process is initially loaded from an executable, it may inherit the color(s) stored in the file system for or with the executable.

In general, the descriptor 220 may be provided in any suitable format. The descriptor 220 may for example be formed as a vector of binary flags or other attributes that form the 'color' or description of an object 218. The descriptor 220 may also, where appropriate, include scalar quantities for certain properties. For example, it may be relevant how many times a system file was accessed, or a remote resource was requested, and this information may be suitably encoded in the descriptor 220 for use in coloring objects with the coloring system 214 and applying rules for IOC detection by the IOC monitor 221.

An indication of compromise (IOC) monitor 221 may be provided to instrument the endpoint 202 so that any observable actions by or involving various objects 218 can be detected. As with the coloring system 214, it will be understood that the types of observable actions will vary significantly, and the manner in which the endpoint 202 is instrumented to detect such actions will depend on the particular type of object 218. For example, for files or the like, an API for a file system may be used to detect reads, writes, and other access (e.g., open, read, write, move, copy, delete, etc.), and may be configured to report to or otherwise initiate monitoring of the action taken with the file through the file system. As another example, kernel objects may be instrumented at the corresponding object handle or in some other manner. As a further example, a kernel driver may be used for intercepting a process startup. While a wide variety of objects are contemplated herein, one of ordinary skill in the art may readily create suitable instrumentation for any computing object so that it may be monitored by the IOC monitor 221.

It will be noted that suitable instrumentation may be coded for a variety of functions and circumstances. For example, instrumentation may usefully track requests for network access or other actions back to a particular application or process, or data payloads back to a particular file or data location. One of ordinary skill in the art can readily implement suitable traces and/or logging for any such information that might be useful in a particular IOC monitoring operation.

In general, the IOC monitor 221 applies rules to determine when there is an IOC 222 suitable for reporting to a threat management facility 204. It will be understood that an endpoint 202 may, in suitable circumstances and with appropriate information, take immediate local action to remediate a threat. However, the monitor 221 may advantageously accumulate a sequence of actions, and still more advantageously may identify inconsistencies or unexpected behavior within a group of actions with improved sensitivity by comparing descriptors 220 for various objects 218 involved in relevant actions and events. In this manner, rules may be applied based upon the descriptors 220 that better discriminate malicious activity while reducing the quantity and frequency of information that must be communicated to a remote threat management facility 204. At the same time, all of the relevant information provided by the descriptors 220 can be sent in an IOC 222 when communicating a potential issue to the threat management facility 204. For example, during the course of execution a specific process (as evidenced by its observed actions) may be assigned color descriptors indicating that it is a browser process. Further, the specific process may be assigned an attribute indicating that it has exposed itself to external URLs or other external data. Subsequently, the same process may be observed to be taking an action suitable for an internal or system process, such as opening up shared memory to another process that has coloring descriptions indicating that it is a system process. In this case, when this last action is observed an inconsistency in the various color descriptors between the subject of the action—the externally exposed browser process—and the target of the action may result in a well-defined IOC, which may be directly processed with immediate local action taken, or reported externally, or both.

Thus, an endpoint 202 in an enterprise 210 may be instrumented with a coloring system 214 and monitor 221 to better detect potentially malicious activity using descriptors 220 selected for relevance to threat detection and a corresponding set of rules developed for the particular descriptors 220 that are being used to label or color various objects 218. By way of example, the object 218 may be a web browser that starts off being colored as a 'browser' and an 'internet facing' application. Based on this descriptor 220, a range of behaviors or actions may be considered normal, such as accessing remote network resources. However, if an object 218 colored with this descriptor 220 attempted to elevate privileges for a process, or to access a registry or system files, then this inconsistency in action may trigger a rule violation and result in an IOC 222.

In general, any action or series of actions that cumulatively invoke a particular reporting or action rule may be combined into an IOC 222 and communicated to the threat management facility 204. For example, an IOC 222 may include a malicious or strange behavior, or an indication of a malicious or strange behavior. The IOC 222 may be a normalized IOC that expresses one or more actions in a platform independent manner. That is, the IOC 222 may express a malicious behavior or suspected malicious behavior without reference to platform-specific information such as details of an operating system (e.g., iOS, MacOS, Windows, Android, Linux, and so forth), hardware, applications, and so forth. Thus, a normalized IOC may be suitable for identifying a particular threat across multiple platforms, and may include platform independent processes, actions, or behaviors. The normalized IOC may be generated from the IOC 222, e.g., it may be a converted version of the IOC 222 suitable for use with multiple platforms, or it may simply be any IOC 222 that has been created in a platform independent form. Process colorization (i.e., using the coloring system 214) as described herein may be used to create a normalized IOC.

In general, a threat management facility 204 for the enterprise 210 may include an IOC collector 226 that receives the IOC 222 from the endpoint 202 and determines an appropriate action. This may include any suitable remedial action, or where one or more IOCs 222 are inconclusive, continued monitoring or increased monitoring as appropriate.

The threat management facility 204 may provide a variety of threat management or monitoring tools 224, any of which may be deployed in response IOCs 222 collected by the IOC collector 226. These tools 224 may include without limitation a scanning engine, whitelisting/blacklisting, reputation analysis, web filtering, an emulator, protection architecture, live protection, runtime detection, APT detection, network antivirus products, IOC detection, access logs, a heartbeat, a sandbox or quarantine system, and so forth.

The analysis facility 206 may provide a remote processing resource for analyzing malicious activities and creating rules 234 suitable for detecting IOCs 222 based on objects 220 and descriptors 220. It is generally contemplated that suitable attributes of each descriptor 218 and rule 234 be developed together, so that objects 218 can be appropriately labeled with descriptors 220 that permit invocation of rules 234 and creation of IOCs 222 at appropriate times. The analysis facility 206 may include a variety of analysis tools 228, including without limitation, tools for regular expression, whitelisting/blacklisting, crowd sourcing, identifiers, and so forth. The analysis tools 228 may also or instead include information and tools such as URL look-ups, genotypes, identities, file look-up, reputations, and so forth. The analysis facility 206 may also provide numerous related functions such as an interface for receiving information on new, unknown files or processes, and for testing of such code or content in a sandbox on the analysis facility 206.

The analysis facility 206 may also or instead include a compromise detector 230, where the compromise detector 230 is configured to receive new threat information for analysis and creation of new rules and descriptors as appropriate, as well as corresponding remedial actions. The compromise detector 230 may include any tools described herein or otherwise known in the art for detecting compromises or evaluating new threats in an enterprise 210.

In general, rules 234 may be manually created with corresponding semantics, e.g., where a process is labeled as a browser process or other category or type that can be interpreted by a human. It should, however, be appreciated that the compromise detector 230 may also be configured to automatically generate descriptors 220 and rules 234 suitable for distribution to a threat management facility 204 and an endpoint 202. In this latter mode, the meaning of a particular descriptor 220 may not have a readily expressible human-readable meaning. Thus, it will be understood that attributes selected for relevance to threat detection may include conventional attributes, as well as attributes without conventional labels or meaning except in the context of a particular, computer-generated rule for threat detection.

In general, the analysis facility 206 may be within an enterprise 210, or the analysis facility 206 may be external to the enterprise 210 and administered, for example, by a trusted third party. Further, a third-party source 216 may provide additional threat data 238 or analyses for use by the analysis facility 206 and the threat management facility 204. The third-party resource 216 may be a data resource that provides threat data 238 and analyses, where the threat data 238 is any data that is useful in detecting, monitoring, or analyzing threats. For example, the threat data 238 may include a database of threats, signatures, and the like. By way of example, the third-party resource 216 may be a resource provided by The MITRE Corporation.

The system 200 of FIG. 2 may also include a reputation engine 240 having a plurality of reputations 242.

The reputation engine 240 may include a reputation management system for the generation, analysis, identification, editing, storing, etc., of reputations 242. The reputation engine 240 may include reputation-based filtering, which may be similar to the reputation filtering discussed above with reference to FIG. 1. The reputation engine 240 may be located on the threat management facility 204 or the endpoint 202 as shown in FIG. 2, or the reputation engine 240 may be located elsewhere in the system 200. The reputation engine 240 may receive an IOC 222 or a stream of IOCs 222, and may generate or utilize reputations 242 for the IOCs 222. The reputation engine 240 may also or instead receive actions, behaviors, events, interactions, and so forth, and may generate or utilize reputations 242 for any of the foregoing. The reputation engine 240 may generate or revise a reputation 242 based on behaviors, actions, events, interactions, IOCs 222, other reputations 242, a history of events, data, rules, state of encryption, colors, and so forth. The reputation engine 240 may utilize a third-party resource, e.g., for the third-party resource's reputation data.

The reputations 242 may include reputations for any of the objects 218 as described herein. In general, the reputations 242 may relate to the trustworthiness of the objects 218 or an attribute thereof (e.g., the source of the object 218, a behavior of the object 218, another object interacting with the object 218, and so forth). The reputations 242 may include lists of known sources of malware or known suspicious objects 218. The reputations 242 may be stored in a reputations database included on the reputation engine 240 or located elsewhere in the system 200. The reputations 242 may be expressed in any suitable or useful level of granularity such as with discrete categories (e.g., trusted, untrusted, unknown, malicious, safe, etc.) or with a numerical score or other quantitative indicator. The reputations 242 may also be scaled.

In general, in the system 200 of FIG. 2, a malicious activity on the endpoint 202 may be detected by the IOC monitor 221, and a corresponding IOC 222 may be transmitted to the threat management facility 204 for remedial action as appropriate. The threat management facility 204 may further communicate one or more IOCs 222 to the analysis facility 206 for additional analyses and/or resolution of inconclusive results. Having described the entities in a threat management system, a number of specific processes for managing threats such as APTs are now described in greater detail.

Figure 3:
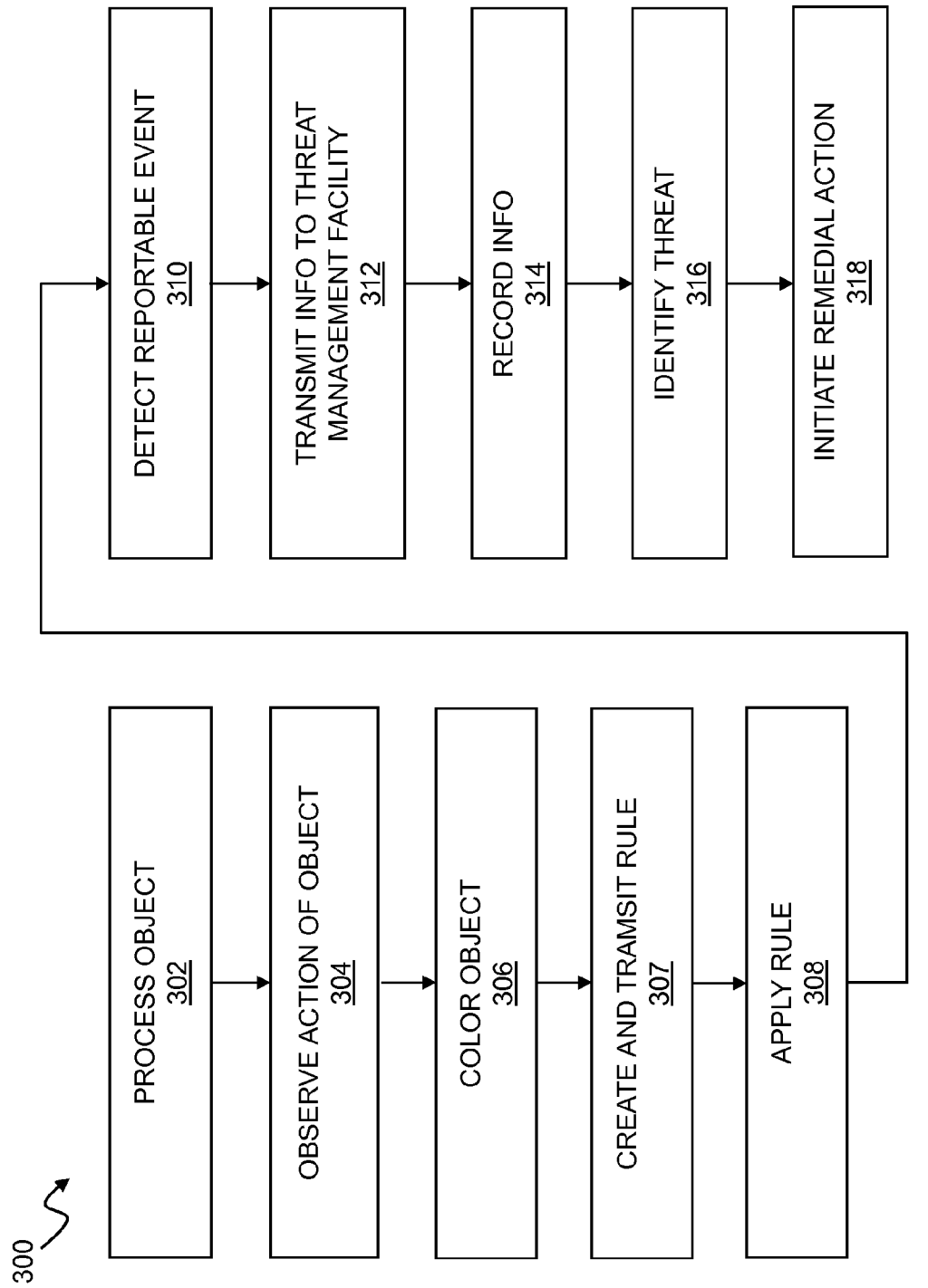
FIG. 3 is a flowchart of a method for coloring.

FIG. 3 is a flowchart of a method for coloring. In general, FIG. 3 shows a method 300 in which objects are colored based on actions, or more particularly observed actions, e.g., actions that can be detected through suitable programmatic instrumentation of an endpoint. In general, an action is intended to refer to a discrete, observable act by, from, or on an object, whereas a behavior is intended to refer to a manner of behavior, a collection of actions, or a type of reaction, response, or interaction with other objects. Thus, while an action is generally intended as a more narrow term, the two are occasionally used interchangeably in the following description, and while behaviors should be considered to include actions and actions should be considered to form behaviors, these two terms are not exclusive of one another and these terms as well as similar terms (e.g., event) are intended to be used interchangeably unless clearly indicated to the contrary or otherwise clear from the context.

As shown in step 302, the method 300 may include processing an object on an endpoint. The object may be any object as described herein, e.g., with reference to FIG. 2. Processing an object may include acting on the object, e.g., by opening a file or launching an application, or taking an action based on the object such as by accessing a network resource based on a URL, or executing an object where the object includes a process, function, dynamic linked library or other executable object. As noted above, the term object is intended to be construed broadly, e.g., as any computing item that can take an action, or be the subject or object of an action by another object. As such, processing an object as contemplated herein is intended to be correspondingly broad, and include any action or event that might be instrumented as described herein for rule based analysis, e.g., using descriptors for such objects.

As shown in step 304, the method 300 may include observing an action or behavior of the object. Observing an action may include detecting any observable action on the endpoint related to the object, such as wherever an API is used by the object, or to access the object, or the like. Observing an action may include identifying the action or a related behavior. Observing an action may include monitoring actions by a device, and providing a plurality of actions to a threat detection system.

As shown in step 306, the method 300 may include coloring the object. Coloring the object may occur in response to an observed action, e.g., a first observed action. The action may be any action, attribute, trait, and so forth, e.g., as discussed herein. Coloring the object may be otherwise related to an attribute of the object. Coloring may be based on an inference made about the object, where the basis for the inference may be a baseline of actions, behaviors, or attributes. The object may be colored with a descriptor of a context for the observed action, where the context includes one or more attributes selected for a relevance to threat detection. The descriptor may be any as described herein, including without limitation, a reputation of the object, a reputation of a second object associated with a first observed action, a reputation of the object (e.g., where the reputation is selected based on a second reputation of a second object associated with a first observed action), reputation selected from a group consisting of 'good,' 'bad,' and 'unknown,' a reputation selected from a group consisting of 'in' or 'out,' an ownership of the object including one or more of private and corporate (e.g., where the object includes data), information about a network resource requested in an action, information about access to an unprotected object requested in an observed action, and so forth. Thus, coloring the action may include determining a descriptor for the action. The first observed action may include a behavior of the object and the descriptor may be inferred based on the behavior. In general, the descriptor may include some inferred property of the object. For example, from the behavior of the object (or other characteristic), the object may be inferred to be, e.g., a productivity application, a resource for financial tools (e.g., a finance spreadsheet), a data sheet, an internet facing application, a system application, an updater application, and so forth. By way of example, and as explained in more detail below, this inference may be useful in finding inconsistencies (e.g., a productivity application may be used to interact with external data, so if the productivity application interacts with internal data, this inconsistency can be identified and flagged).

The colors may be any color as described herein, e.g., with reference to FIG. 2. For example, the colors may be any useful properties of the object based on the observed action, such as an inferred property. This may include without limitation being colored as a type or category of application such as a browser, an item/process connecting to out of network resources (e.g., non-corporate resources) or otherwise attempting a connection, an item/process exposed to out of network data (e.g., non-corporate data, unprotected data, and the like) or otherwise attempting exposure, an item/process accessing secure data (e.g., corporate data) or otherwise attempting access, and so forth.

Coloring the object may include coloring the object that is performing an action or behavior or the object that is receiving the action or behavior (i.e., the object in the system being acted upon). Thus, coloring may be based on the context (e.g., the complete context) of an event including an action as well as the current colors of the objects acting and object(s) being acted upon.

In one aspect, coloring includes labeling the object as 'good,' 'bad,' 'unknown,' 'problematic,' or the like, e.g., based on known objects or behaviors. Coloring may thus aid in detecting and eliminating high-value events before having to analyze such events.

Coloring the object may include identifying a group of associated events or actions together, where processes of underlying executables are colored based on their actions or behaviors. The processes may be colored based on their known or predicted behaviors. Also, the processes may continue to be colored based on their observed behaviors. A process may have one color or a plurality of colors forming a color vector, and the color may also include a scalar such as a counter associated with one or more of the plurality of colors. This may be particularly helpful where, for example, the number of system calls, remote network requests, or other actions or items are relevant to threat detection. The color may be unique to a specific process or it may be a shared color for a number of different processes that have similar actions or behaviors. The coloring may allow the system to determine properties about an action or process. Coloring may also assist in preventing cross-pollution of corrupted components.

As shown in step 307, the method 300 may include creating and transmitting a rule. The rule may be automatically created for detecting a threat on an endpoint or device based upon a plurality of descriptors for the device, e.g., in the instance where a plurality of actions are monitored by a device and descriptors are created for each of the actions. The rule may be transmitted to the endpoint or device, e.g., by a threat management facility or the like. As described herein, the rule may compare at least one of the plurality of descriptors to a known or expected descriptor to identify an inconsistency.

As shown in step 308, the method 300 may include applying a rule. The rule may be applied in response to a second observed action of the object. The second observed action of the object may be a separate action from the first observed action (i.e., there may be a plurality of observed actions/behaviors) or the second observed action may be the same as the first observed action (i.e., there may be only one observed action for the object). In other words, in an implementation, the method 300 observes an action of the object, colors the object based on that observed action (e.g., an inference made based on characteristics of the action), and then applies a rule based on that observed action. The characteristics may include the source of the action, interactions of the action, reputations, a pattern of the action, and so forth. Applying the rule may be dependent on the descriptor.

The rule may be any of the rules as described herein, e.g., with reference to FIG. 2. The rule may be configured to flag when there is an inconsistency between object(s), action(s), behavior(s), item(s) acted upon or engaged, and so forth. The rule may take into account the reputations, known properties, inferred color descriptors, and any other information that might be included in a descriptor as described herein. For example, the rule may compare information in the descriptor for the object with information in a second descriptor for one or more other objects associated with an observed action. The rule may evaluate a consistency between the descriptor for the object and a second descriptor for one or more other objects associated with an observed action.

The rules may be applied for many purposes, including without limitation, to detect a reportable event such as an IOC as described above, to test for a reportable event, to ensure correct coloring, for error, and so forth. The rule may result in generating a flag, an alert, a report, a signal, a transmission, and the like, which may be communicated to a threat management facility for further action and/or used for immediate remediation on an endpoint. The rule may also or instead evaluate the descriptor for a change occurring to the descriptor during an observed action.

The rules may be related to the colored objects. The rules may be written, formed, or implemented in such a manner that violation of a rule triggers an alert. The rules may call for certain colored objects to interact, communicate, or engage only with a specifically colored object or specific set of other colored objects. In one aspect, implementing rules may be part of processing the object. One of ordinary skill in the art will appreciate that the rules may be scripted or otherwise expressed in any suitable form for computer implementation, and may employ any suitable Boolean operators, limits, ranges, orders of steps, quantitative conditions, and so forth amenable to expression for use in identifying potentially malicious activity on an endpoint.

As shown in step 310, the method 300 may include detecting a reportable event such an IOC as described herein based upon a rule violation. Coloring objects as described herein may facilitate significant simplification of rules that can be applied by the endpoint. For example, a rule may be violated when a specific colored object interacts with another specific colored object in an unusual, suspicious manner, or a manner that otherwise is of interest to a detection system. In this manner, when certain colored objects include actions that interact/communicate/engage with other colored objects, the chain of events may be monitored and patterns that are of interest may be observed, detected, and reported. By way of example, if a browser process attempts to interact with a non-browser process, this action may be detected, which may include detection using the colorization described herein (e.g., the browser process may be colored 'x' and the non-browser process may be colored 'y,' where 'x' and 'y' processes interacting together triggers an IOC).

Thus, the reportable event may include without limitation the interaction of colors that are not expected to interact, or for which a particular interaction is otherwise of interest. The reportable event may also or instead include detecting a certain color, reputation, object, behavior, and so forth. The reportable event may be based on inferences made by the rules or another component of a system.

As shown in step 312, the method 300 may include transmitting information to a threat management facility. The information may include information about the reportable event, e.g., a description of the reportable event. The information may also or instead include one or more object that invoked a rule violation, along with a descriptor of the context for each object. In an implementation, the information may include the object, its action/behavior, the item being acted upon or engaged by the object, and any related descriptors for the object(s) that provide context for the rule violation. The context may include without limitation one or more of a reputation of the object, an inferred behavior of the object, a source of the object, a type of the object, and so forth. The information may include a report. The report may include the information, where the report/information is available to a detection system such that the system can further utilize additional context for objects and behaviors.

Transmitting information may also or instead include sending an alert based on a rule violation. The alert may include reporting an IOC to an APT detection system or the like. Intelligent scripts can then be made based on the rule violations for high value events. The reporting of IOCs may be done in a platform independent manner, e.g., using the techniques described throughout this disclosure such as the normalized IOCs. The use of behaviors/genes may assist in detecting and reporting IOCs in a platform independent manner.

As shown in step 314, the method 300 may include recording the information including a description of the reportable event and the object along with the descriptor of the context. Recording the information may occur at a monitoring service, or at any of the components shown in the systems of FIGS. 1 and 2. Recording the information may include accumulating the information into a history of events or the like. The history of events may be configured to allow a detection system to find the source of a problem and identify the code, download, executable, DLL, exploit, tool, other antivirus item, and the like, that contribute to the problem. This information may allow for a detection system to generate a reputation, whitelisting rules, blacklisting rules, and so forth. Recording the information may include adding the information to a database (local or remote) or creating a database, e.g., a database of events for a detection system. In this manner, recording the reportable events from the endpoint may assist in identifying a threat based on the event history.

As shown in step 316, the method 300 may include identifying a threat based on the reportable event. This may be accomplished by the threat management facility or another component of the systems and networks described herein.

As shown in step 316, the method 300 may include initiating a remedial action. The remedial action may include without limitation generating an alert, quarantining the endpoint, disabling communications by the endpoint, terminating one or more processes on the endpoint, modifying a firewall rule for the endpoint, and so forth. This may be accomplished by the threat management facility or another component of the systems and networks described herein.

Figure 4:
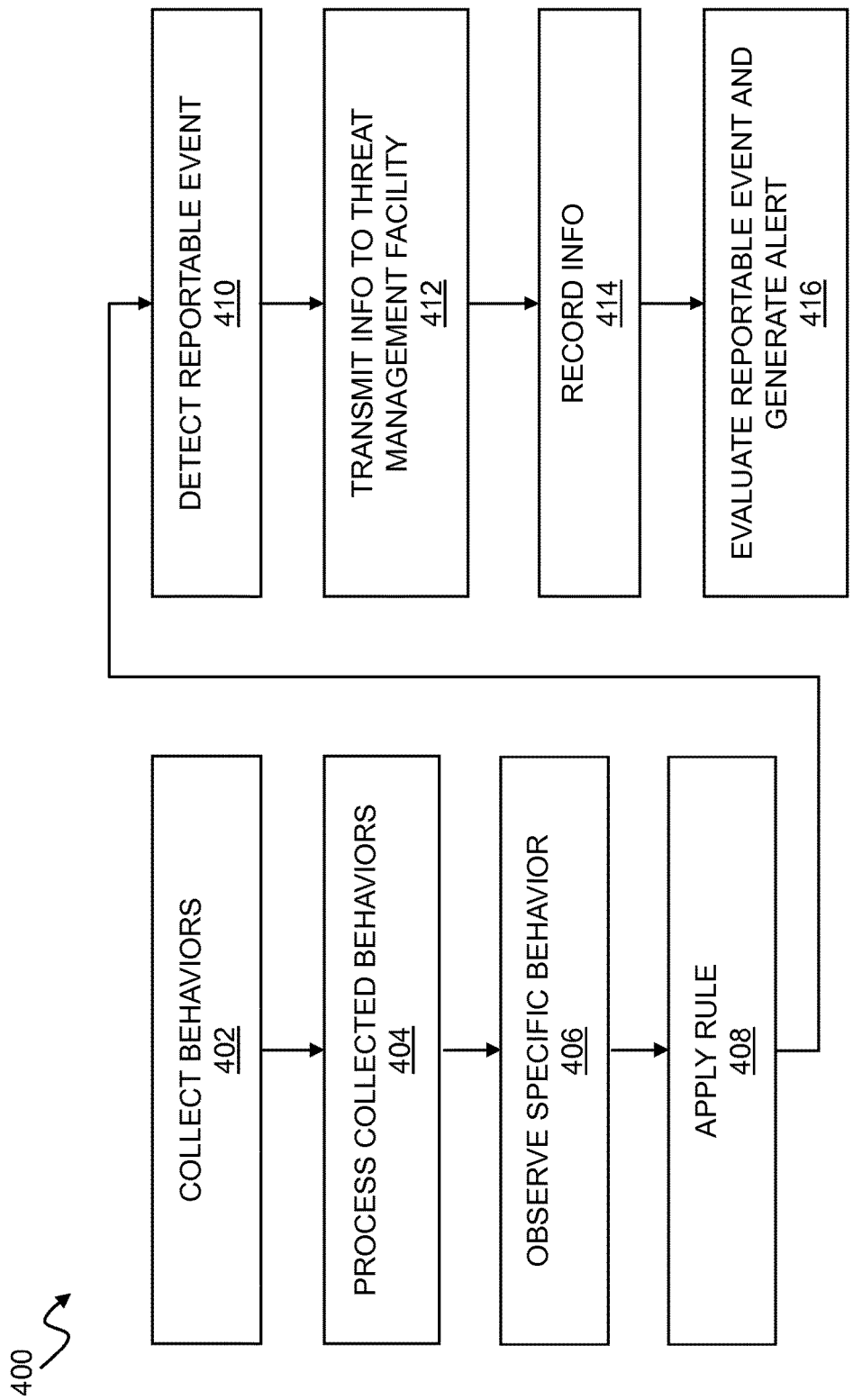
FIG. 4 is a flowchart of a method for data behavioral tracking.

FIG. 4 is a flowchart of a method for data behavioral tracking.

As shown in step 402, the method 400 may include collecting a plurality of behaviors of data on an endpoint. This may be accomplished using a monitoring facility such as the IOC monitoring facility or any other suitable monitoring facility as contemplated herein. For example, where data is stored in files, monitoring may include monitoring an API for a file system that manages the files. Collecting behaviors may thereby form a plurality of collected behaviors, which may be incorporated in a database or history of behaviors. The behaviors may also or instead include objects as described herein. Behaviors may include movement of the data, e.g., copying the data or transmitting the data (e.g., found by firewalls locally, through a network, or on a server). Edits and changes to the data may also be tracked, e.g., including edits made by a user or an executable (e.g., productivity tools) that created a process that is doing the editing. Behaviors may also or instead include users or applications (or other objects) that create data, access data, modify data, delete data, or otherwise interact with data in an observable manner. For example, a scanning program or indexing program may read, interpret, or organize data. Users may also read the data, where the users are different from the users that edit and write to the data within the file.

As shown in step 404, the method 400 may include processing the plurality of collected behaviors to obtain a baseline of known behaviors. Processing the behaviors may include analyzing the database of behaviors. The behaviors may include trusted behaviors, malicious behaviors, suspected malicious behaviors, known behaviors, unknown behaviors, expected behaviors, unexpected behaviors, and so forth. The processing may also or instead include coloring a specific behavior with a descriptor of a context for the specific behavior, where the context includes one or more attributes selected for a relevance to threat detection. The processing may also or instead include coloring an executable with a descriptor of a context inferred from the specific behavior.

As shown in step 406, the method 400 may include observing a specific behavior of the data on the endpoint using the monitoring facility. The specific behavior may be one behavior or a plurality of behaviors. The specific behavior may include any of the behaviors described herein. For example, the specific behavior may include a movement of the data, e.g., copying the data, transmitting the data (e.g., to a remote location), and so forth. The specific behavior may also or instead include a change to the data, e.g., implemented by a user or by an executable executing on the endpoint.

As shown in step 408, the method 400 may include applying a rule in response to the specific behavior. The rule may include a comparison to the baseline of known behaviors. The rule may also or instead be any of the rules as described herein, e.g., with reference to FIG. 2. Applying the rule may identify an inconsistency in a descriptor for a specific behavior with other descriptors. The other descriptors may include a descriptor for a source of the specific behavior, a descriptor for a behavior included in the baseline of known behaviors, and the like. The rule may also or instead compare a descriptor of an executable with a descriptor of data, or compare a reputation of the data to a reputation of a process interacting with the data.

As shown in step 410, the method 400 may include detecting a reportable event. The reportable event may be an IOC or the like determined though an analysis of the observed behavior, e.g., comparing the behavior to the baseline of known behaviors. The reportable event may also or instead include detecting a rule violation using, e.g., any of the techniques described herein. The reportable event may also or instead include a deviation of a specific behavior from a baseline of known behaviors, or the specific behavior exhibiting a similarity to a known or suspected malicious behavior.

As shown in step 412, the method 400 may include transmitting information to a threat management facility. The information may include information about the reportable event, e.g., a description of the reportable event and the specific behavior. The information may include a report. The report may include the information, where the report/information is available to a detection system such that the system can further utilize additional context for behaviors. Transmitting information may also or instead include sending an alert.

As shown in step 414, the method 400 may include recording the information including a description of the reportable event and the specific behavior. Recording the information may include accumulating and retaining the information into a history of behaviors or the like. Recording the information may include adding the information to a database (local or remote) or creating a database, e.g., a database of behaviors for a detection system. The history or database of behaviors may be utilized for the creation of a baseline of known behaviors. In this manner, the method 400 may further include storing the plurality of collected behaviors on a database or the like.

As shown in step 416, the method 400 may include evaluating the reportable event, e.g., at the threat management facility, and generating an alert in response to the reportable event.

Data behavioral tracking may also be similar to coloring and endpoint recording as discussed herein. For example, data behavioral tracking may comprise a method including: processing data on an endpoint; coloring the data in response to a first observed behavior with a descriptor of a context for the first observed behavior, where the context includes one or more attributes selected for a relevance to threat detection; applying a rule in response to a second observed behavior of the data to detect a reportable event; and transmitting information to a threat management facility about the reportable event, where the information includes a description of the reportable event and the data along with the descriptor of the context.

Devices, systems, and methods for management of encryption systems will now be discussed. The architecture for the management of encryption systems may be similar to those shown in FIGS. 1 and 2, or similar to that shown in FIG. 5 described below.

In general, encryption solutions of the prior art are not easily accessible to most users. Specifically, users are often fearful of losing data and are daunted by access control, which can be difficult to manage. In today's antivirus and APT protection systems, once an infection, compromise, or breach occurs on a single system, all data on that system may be vulnerable even if the event results in the shutdown of all access from that endpoint. Further, it is often difficult to differentiate between different programs running on behalf of the same privileged user, such that some software is allowed to access protected data and other software is not. It may also be challenging to differentiate between software that has been exposed to a potential threat versus the exact same software that hasn't been exposed. The techniques described herein may provide for simplified management of encryption systems.

Figure 5:
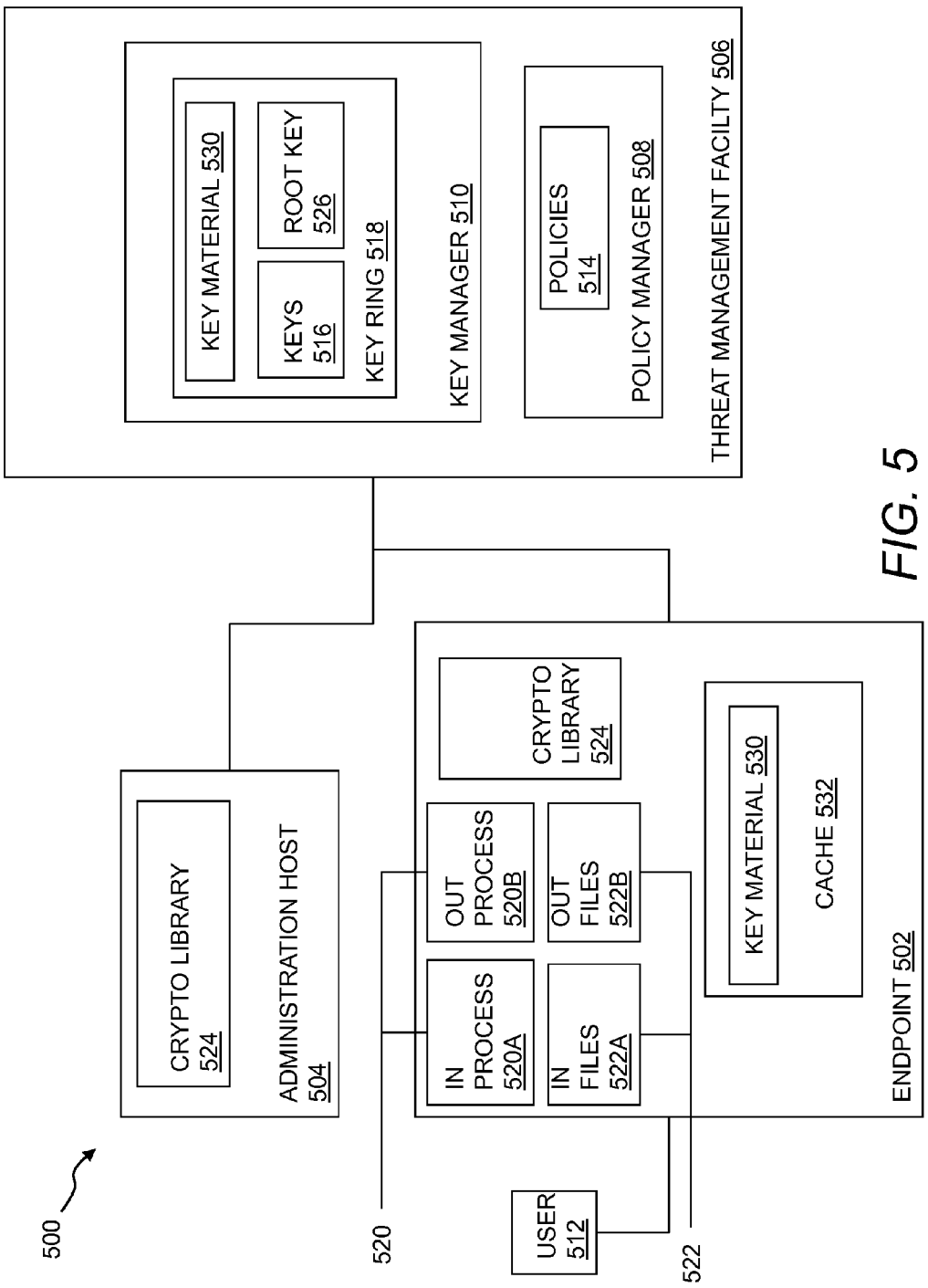
FIG. 5 illustrates a system for encryption management.

FIG. 5 illustrates a system for encryption management.

Generally, the system 500 may include endpoints 502, an administration host 504, and a threat management facility 506, which may include policy manager 508 and key manager 510. The system 500 may provide for the management of users 512, policies 514, keys 516 (e.g., disposed on key rings 518), and endpoints 502 (e.g., from the administration host 504). The system 500 may utilize various storage and processing resources, which may be disposed in a cloud or the like.

The endpoints 502 may be any of the endpoints as described herein, e.g., with reference to the other figures. The endpoints 502 may also or instead include end user devices and other devices to be managed. The endpoints 502 may include a web browser for use by the users 512, with supporting cryptographic functions implemented using cryptographic libraries in the web browser. The endpoints 502 may communicate with the other components of the system 500 using any suitable communication interface, which may include Secure Socket Layer (SSL) encryption, Hypertext Transfer Protocol Secure (HTTPS), and so forth for additional security.

The endpoints 502 may include objects as described herein. For example, the endpoints 502 may include processes 520 and files 522. The processes 520 may be labeled (e.g., by a coloring system using descriptors as described above) in such a manner that the process is 'IN,' where the process 520 is in compliance with policies 514 administered for the endpoint 502 from a remote threat management facility 506, or the process is 'OUT,' where the process 520 is out of compliance with a policy (or a number of policies) in the policies 514 for an enterprise. This may provide IN processes 520A and OUT processes 520B as shown in FIG. 5. The files 522 may be similarly labeled by a coloring system with descriptors that identify each file 522 as IN, where the file 522 complies with the policies 514 and is accordingly encrypted using, e.g., a remotely managed key ring 518, or the file is OUT, where the file 522 does not conform to the policies 514 and is accordingly not encrypted using the remotely managed key ring 518. This may provide IN files 522A and OUT files 522B as shown in FIG. 5. One skilled in the art will recognize that other objects of the endpoint 502 or other components of the system 500 may be labeled in a similar manner where they are either IN or OUT.

In an implementation, the system 500 may include determining whether an endpoint 502 is IN or OUT or whether a component of the endpoint 502 is IN or OUT, which may be based upon a set of rules (e.g., the rules outlined herein) or policies such as the policies 514 described herein. In some aspects, if the endpoint 502 is OUT, the endpoint 502 does not have key access or access to any protected content. In this manner, data protection may be a consequence of endpoint protection. In some aspects, if the endpoint 502 is IN, the endpoint 502 may have access to protected content. If an endpoint 502 is OUT, it may be out of compliance with the rules of the encryption system. Determining endpoint protection may also or instead include determining whether executables, processes 520, files 522, etc., on the endpoint 502 are IN or OUT, which may be based upon rules or policies 514 as described herein.

The administration host 504 may include a web browser, which may include a cryptography library 524 and a web user interface (e.g., HTML, JavaScript, etc.). An administrator may utilize the web user interface to administer a key management system and perform administrative functions such as creating and distributing keys 516, establishing security policies, creating key hierarchies and rules, and so forth. The endpoint 502 may also include a cryptographic library 524 implementing cryptographic protocols for using key material in the key ring 518 to encrypt and decrypt data as needed.

The threat management facility 506 may include any of the threat management facilities or similar systems described herein. In general, the threat management facility 506 may include a policy manager 508 and key manager 510. Alternatively, one or more of the policy manager 508 and key manager 510 may be located elsewhere on a network.

The policy manager 508 may implement one or more policies 514, and maintain, distribute, and monitor the policies for devices in an enterprise. The policies 514 may include a cryptographic protocol design, key servers, user procedures, and other relevant protocols, or these cryptographic protocols may be provided elsewhere for use by the policy manager 508. The policies 514 may also include rules for compliance that can be applied to determine whether objects and components are 'IN' or 'OUT' as explained in more detail herein.

The key manager 510 may be part of the threat management facility 506, or it may be remotely managed elsewhere, e.g., in a remote cloud resource or the like. The key manager 510 may also or instead be disposed on the administration host 504 and one or more endpoints 502 in a manner independent of the threat management facility 506. In this manner, all cryptographic operations may be isolated from the threat management facility 506 and instead may be performed by a web browser or the like executing on the administration host 504 or an endpoint 502. The key manager 510 may manage the keys 516, including managing the generation, exchange, storage, use, and replacement of keys 516. The key manager 510 may include a key ring 518, where the keys 516 are disposed on the key ring 518 using one root key 526. The key manager 510 may also or instead include a variety of key management and other secure processes, including without limitation, administrator registration, establishing trust to endpoints 502, key distribution to endpoints 502, policy deployment, endpoint status reporting, and local key backup.

The users 512 may have full access to encrypted data. Alternatively, the users 512 may have limited access to encrypted data, or no access to encrypted data. Access may be limited to users 512 using endpoints 502 that are deemed 'IN' by the system, as well as to processes 520 that are IN, as further described herein.

The keys 210 may include cryptographic keys in a cryptosystem, i.e., decryption keys. In one aspect, the keys 210 may be disposed on one key ring 218 using one root key 220. In general, the keys 210 may be created and managed using, e.g., symmetric key technology, asymmetric key technology, or any other key technology or combination of key technologies suitable for securing data in an enterprise including, for example the Data Encryption Standard (DES), Triple DES, Advanced Encryption Standard (AES), and so forth, as well as a public key infrastructure or the like supporting the distribution and use of keys.

The key ring 518 may facilitate simplified management of the system 500. For example, by reducing the data protection system down to a single key ring 518, it may eliminate the management of keys 516. In one aspect, all of the data is protected by one root key 526. Reducing the data protection system down to a single key ring 518 with all of the data protected by one root key 526 may allow for all privileged users 512 to have access to all data. In this embodiment, data is either 'IN' (i.e., encrypted), or it's 'OUT' (i.e., not encrypted). In one aspect, the default system does not include any additional shade of access control.

The cryptography library 524 may be disposed on the administration host 504 as shown in FIG. 5. The cryptography library 524 may also be disposed on the endpoint 502, e.g., in a web browser, or it may be disposed on another component of the system 500. The cryptographic library 524 may be installed by an administrator. In general, key material 530 from the key ring 518 may be stored in a cache 532 on the endpoint 502 within any suitable memory on the endpoint 502 for use in encryption and decryption as contemplated herein.

In another aspect, an improved encryption solution includes a data protection system constructed in such a way that the consequence of enrolling that system in an endpoint protection system substantially eliminates the concern for lost key material or corrupted systems.

Figure 6:
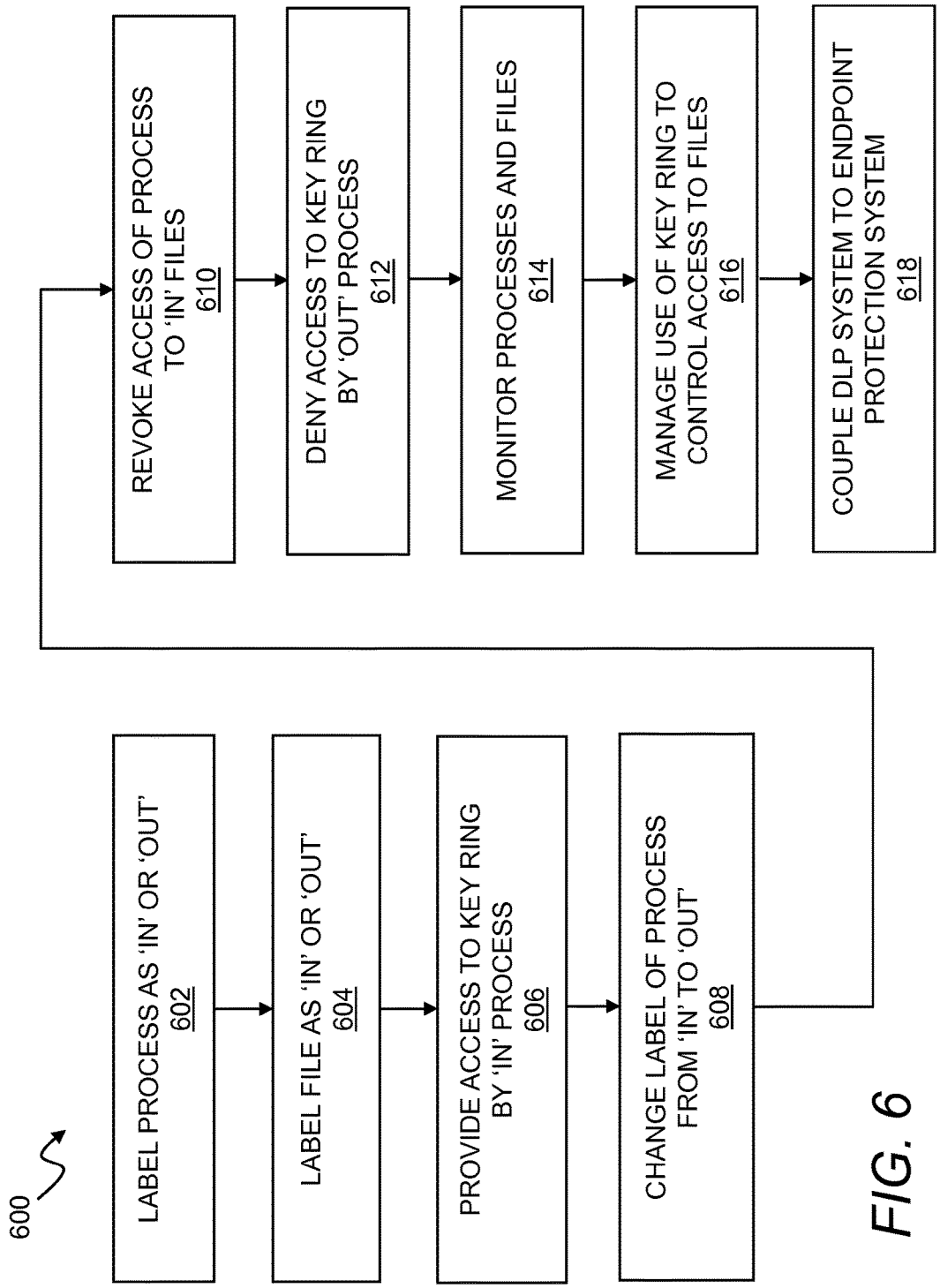
FIG. 6 is a flowchart of a method for encryption management.

FIG. 6 is a flowchart of a method for encryption management. In general, the method 600 may include monitoring objects within an endpoint where, as soon as any object exposes itself to untrusted, unknown, or low reputation information, then that object is prevented from opening any new handles to protected content. In other words, if an object is highly trusted it is IN, and if an object is not highly trusted it is OUT. The reputation may be associated with a state of encryption where encrypted data has a better reputation than non-encrypted data. The method 600 may provide seamless and transparent access to protected data, seamless automatic data loss prevention (DLP), and reactive and proactive protections for data that is integrated with endpoint protection.

As shown in step 602, the method 600 may include labeling a process as IN or OUT. Specifically, this step 602 may include labeling each of a plurality of processes on an endpoint with a labeling scheme in which a process is either IN or OUT. An IN process may, for example, be a process that conforms to a compliance policy administered for the endpoint from a remote threat management facility or a process conforming to any other locally or remotely managed rule set, administrative policy, security policy, or the like. An OUT process may be a process that does not conform to a compliance policy or the like. Step 602 may therefore provide a plurality of IN processes and a plurality of OUT processes. In one aspect, a policy may either comply with or not comply with the policy and accordingly be either IN our OUT as contemplated herein. In another aspect, IN and OUT may be determined by separate rules or criteria and there may be a third category of unknown or uncertain for a process that conforms to neither rule set, or for which a category has not yet been determined. A process may also or instead conform to both IN and OUT criteria concurrently, and suitable handling for any such overlapping or indeterminate processing may be provided.

The label for a particular process may be inferred from the labeling of an underlying executable or an otherwise associated executable. The processes may also or instead be monitored for compliance with a set of policy rules during execution to determine whether each process is IN or OUT. The actions by a process may be monitored, for example, by monitoring interactions of the process with other objects (e.g., data, files, other processes, etc.) on the endpoint. This may be done for a single process or a plurality of processes (e.g., all processes) of an endpoint. In general, an IN process may have access to keys and protected data, while an OUT process does not.

As shown in step 604, the method 600 may include labeling a file as IN or OUT, for example with the coloring system described herein. This may include labeling each of a plurality of files on the endpoint as either IN or OUT, or labeling a particular file, e.g., at a time when the file is created, accessed, modified, deleted, moved, or otherwise manipulated with a file system. An IN file conforming to the compliance policy may be encrypted using a remotely managed key ring so that corresponding IN data is cryptographically protected. An OUT file that does not conform to the policy may be decrypted or left unencrypted. Step 604 may therefore provide a plurality of IN files and a plurality of OUT files that are correspondingly encrypted and not encrypted. In one aspect, the IN or OUT labels may be inferred from a context in which a file was created, e.g., the label may be inferred based on a corresponding label of a process that created the file. In another aspect, the label may be inferred based on a corresponding label of a process that accessed the file.

Labeling a process may itself be dynamic, and may be updated as the behaviors of a given process are observed. For example, the process may behave in a manner determined to be out of compliance, or a process may merely expose itself to untrustworthy sources. For instance, the process may be labeled OUT when it accesses low or no reputation URLs, or accesses OUT files on the system, or is otherwise exposed to external content, and so forth.

By coupling compliance with encryption, this technique can advantageously simplify data loss prevention (DLP) by ensuring that protection against access and loss is prevented at the moment that a policy violation is detected, rather than based upon independent and complicated heuristics that are otherwise the hallmark of DLP. In particular, access to key material can be a consequence of endpoint protection, such as where an endpoint is enrolled in an endpoint protection mechanism and/or compliant with one or more enterprise security policies.

As shown in step 606, the method 600 may include providing access to the remotely managed key ring, or more particularly to specific key material required to decrypt and use IN files, by the IN processes. This may facilitate conditional or controlled access to the IN files by the IN processes, and may be administered, e.g., through the file system used to access the files or any other suitable interface. Similarly, OUT processes may be denied access to the remotely managed key ring, which does not allow access to the IN files by the OUT processes. For example, the mechanism may revoke or remove the keys for all files based on behavior. The mechanism may also or instead choose to provision keys only when the endpoint is in a known trusted state.

As shown in step 608, the method 600 may include changing a label for one of the processes thereby providing a relabeled process. This may include changing a label from IN to OUT in response to an observed behavior for the process, or this may include changing a label from OUT to IN. Changing a label may be based on exposure, e.g., to objects external to the endpoint. For example, processes may change from being trustworthy to untrustworthy at the time they are exposed to external data (e.g., either known malicious data, suspected malicious data, or unknown data). This may include URLs, loaded files, downloaded data, external processes, external files, opening up files that are labeled OUT when the process is labeled IN, and so forth. The external objects may also or instead include external objects known or suspected to be malicious, or external objects in which a security status is unknown. The observed action may also or instead include exposure to an object labeled as OUT. Changing a label may be based on a reputation of something that the process has been exposed to, e.g., changing a label when there is an exposure to an object with a poor reputation. Changing a label may also or instead be based on specific actions, context, colors of other objects involved, and so forth. Changing a label may also include changing a label for other objects, e.g., files. In this manner, the system may implement a set of coloring rules for keeping track of where objects are in terms of compliance with a security policy or the like, and whether to encrypt data accordingly.

Changing a label may also or instead include changing a label for one or more of the files from IN to OUT or from OUT to IN as a result of a user action that implicitly or explicitly requests a change in the underlying file. By way of example, a user may be able to change a file from OUT to IN to add externally obtained content (e.g., research) into an internal file (e.g., document), or by locally saving a copy of a file attached to an electronic mail. By way of another example, a user may be able to change a file from IN to OUT in order to provide the file to an external user. Again this may occur explicitly with the user explicitly changing the file type, e.g., in a user interface for color management or the like, or this may occur implicitly when the user attaches an IN file to an electronic mail for communication outside the enterprise.

In one aspect, new files created by IN processes are IN and therefore encrypted, and new files created by OUT processes are OUT and therefore not encrypted. In this manner, DLP rules may be simplified—e.g., the system captures file copying and moving (which is likely a creation of a new file and a transmission of data), file saving, cutting and pasting, and so forth. In other words, in an implementation, a user can manually move files from IN to OUT and OUT to IN. In this manner, the techniques described herein may provide for DLP that is explicit (e.g., in the IN/OUT labels), easy to find and understand by users, and audited. In this latter respect, each file may retain a signed or other verifiable IN/OUT history, e.g., in the descriptor for the file, or this data may be independently maintained by the file system, a DLP system, or the like.

The use of the IN/OUT techniques described herein may thus automatically create a DLP system where trusted processes automatically create trusted files and untrusted processes automatically create untrusted files. Also, as discussed above, files may be moved back and forth between IN and OUT or vice versa, such as by sending or receiving electronic mail attachments or other user actions that explicitly or implicitly move data in either direction. To this end, any user-initiated movement of an object from IN to OUT, whether explicit or implicit, may trigger a DLP scan to determine if an object contains, e.g., confidential, protected, or other sensitive information that should not be released outside the DLP domain. This may assist in preventing data leakage or other inappropriate release of data from an endpoint as a result of a requested change from IN to OUT. The reverse is also true, where files may be moved from OUT to IN, e.g., explicitly by a user on an endpoint, or implicitly through a user action such as downloading a file from an Internet location. In this case, a virus scan, APT scan, malware scan, or the like, may be performed at the point where a user is attempting to move an object from OUT to IN to ensure that it complies with any policy requirements for IN objects and will not contaminate a system. In this manner, the techniques may prevent the unwanted release of protected data (e.g., though a DLP scan when an object is attempted to be moved from IN to OUT), and the unwanted contamination of a system (e.g., through a malware scan when an object is attempted to be moved from OUT to IN).

In general, a trusted object or IN object may have access to keys and protected content. These objects may be colored as IN as discussed herein. Similarly, an untrusted object or OUT object may be prevented from using keys or otherwise accessing cryptographically protected content. A variety of rules for labeling and relabeling files, processes and other objects are now described in greater detail. The following rules are presented by way of example only, and are not intended to limit the generality of the techniques contemplated herein.

In an implementation, as soon as an object interacts with an object that is OUT, that object is also OUT. In other words, an interaction something that is OUT may be the high-probability event for initiating a relabeling of something from IN to OUT.

The endpoints may be considered to be IN when they are registered, where IN means that the endpoint is both protected by an endpoint protection system (e.g., in compliance with an endpoint security policy or the like) and that it has cached access to the single key ring for accessing content of IN files.

The executables may be IN through their explicit inclusion on an 'allow' list that uses signed catalogs or other cryptographically verifiable identifiers or strong names. Executables not on this list may initially be labeled as OUT. In one aspect, productivity tools are IN, certain web browsers are OUT, and PDF viewers are IN. In one aspect, an IN object can only be IN on an IN endpoint.

OUT data may include any non-whitelisted URL, or data from such a URL, as well as any file that is labeled or colored as OUT. In one aspect, all data is labeled as IN or OUT. In another aspect, unlabeled data may be presumed OUT until it can be affirmatively labeled one way or the other.

A process that comes from an IN executable may initially be labeled as IN. Similarly, a process that comes from an OUT executable may be initially labeled as OUT. Optionally, relabeling from OUT to IN may be prohibited in all circumstances.

More generally, objects may be colored as IN or OUT. If an object has been exposed to OUT data, then that object may be colored OUT. In another aspect, if a single object exhibits sufficient bad behavior then that object is colored OUT and no more handles to protected or IN files and processes can be created so that, e.g., no additional protected files can be opened. In one aspect, if any behavior on the endpoint is detected to have a significant or sufficient IOC pattern, then the whole endpoint may be flagged as compromised and any suitable key management step may be performed including, e.g., shredding or otherwise permanently removing or deleting any key material on the endpoint so that no IN files can be opened or created by any processes on the endpoint.

In one aspect, objects that are first instantiated on an IN endpoint from an IN executable may be initially labeled as IN, and may not get colored OUT until they exhibit a behavior that makes them OUT, e.g., due to a specific set of inferences, rule violations, or policy violations. In one aspect, all other objects start as OUT. In one aspect, files created by an IN process are IN and files created by an OUT process are OUT.

In one aspect, data loss protection or similar security techniques can be coupled to endpoint policy compliance using this technique so that cryptographic protection automatically follows policy compliance. This approach can advantageously simplify data protection by controlling data security (e.g., encryption) based on a status of policy compliance without any other configuration, setup, or the like. Thus, data loss protection can inform endpoint protection and vice-versa.

Other rules may be usefully implemented in this context to help maintain a useful division between IN objects and OUT objects. When an IN process copies an IN file, the copy may also be treated as an IN file. This avoids complex heuristics that might otherwise be required to properly interpret steps of open/create/read/write for two or more different files. An OUT process may copy the encrypted data in an IN file and create a new IN file. Thus, for example, an electronic mail attachment or a browser download may retain an IN status if the associated file is simply moved or copied.

A user, such as a user with suitable privileges, may expressly mark a file IN that was OUT or vice-versa. For this, a shell extension may be used to facilitate movement of files from IN to OUT or vice-versa. This change may be an explicit (i.e., conscious by the user) and traceable (i.e., loggable) event, and may be used, for example, to help organize files in a system. Filters may also be used in this example (e.g., filters in e-mail). For example, the filters may perform a function when IN content goes to destinations outside of the protected network (e.g., a message comes back saying that this happened, and asks if the user meant to perform this action or another action such as marking the data OUT or encrypting it for the destination).

In one aspect, a process may change from IN to OUT during execution, for example, as a result of retrieving an OUT file. In this case, subsequently created new files by the process will also be OUT, and the process may be prevented from creating new file handles on IN files. Existing file handles may remain accessible in order to avoid execution errors in the application, file system, operating system, or other endpoint software.

As shown in step 610, the method 600 may include revoking access by the relabeled process to the IN files. Access may be revoked, for example, by deleting corresponding key material, or by preventing access through an API for a file system or the like. In general, this may prevent the relabeled process from opening additional IN files or creating any new IN files. Revoking access may occur at the time an action of a process causes a rule violation or when a certain set of color descriptors and actions become out of context (e.g., based upon another rule) because of some other action or event on the endpoint. Revoking access may also or instead occur when an observed action for a process deviates from an expected action.

As shown in step 612, the method 600 may include denying access to the remotely managed key ring by the OUT processes. This may thereby deny access to the IN files by the OUT processes.

As shown in step 614, the method 600 may include monitoring at least one of processes and the files. This may include monitoring the processes for compliance with the compliance policy, and monitoring the files for encryption. This may also or instead include monitoring an action of at least one of the processes. The action may include any action as described herein, e.g., an interaction of at least one of the processes with one or more other processes.

As shown in step 616, the method 600 may include managing use of the key ring to control access to the plurality of files with a file system for the endpoint. The key ring may be managed by any system or technique described herein or otherwise known in the art.

As shown in step 618, the method 600 may include coupling a data loss prevention (DLP) system to an endpoint protection system. It will be understood that in one aspect this does not form a discrete step independent from the other steps of the method 600 described above. Rather, this coupling results from the above features of categorizing as IN or OUT, encrypting IN files for security, and monitoring transitions between IN and OUT so that appropriate DLP and endpoint protection steps can be taken.

Figure 7:
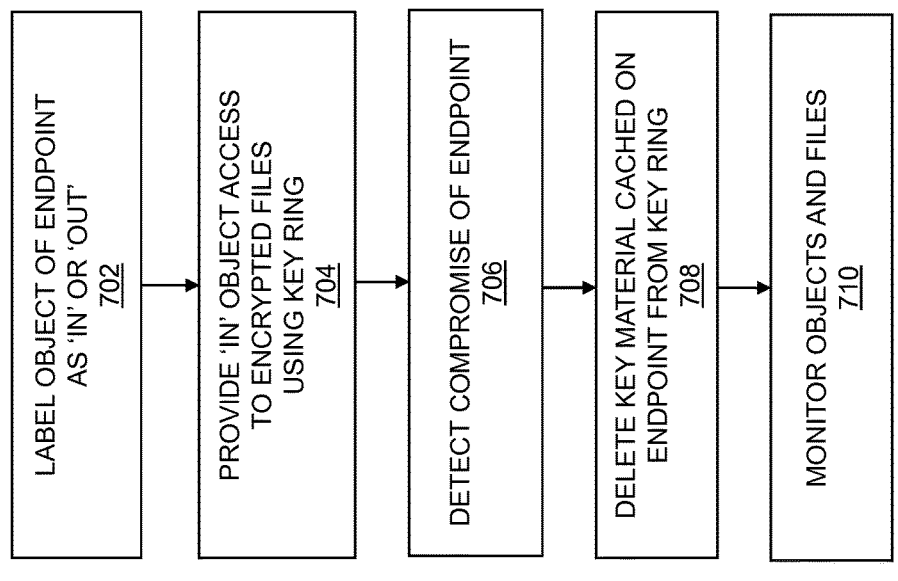
FIG. 7 is a flowchart of a method for behavioral based key shredding.

FIG. 7 is a flowchart of a method for behavioral based key shredding. In general, key material may from a key ring or the like that may be used by an endpoint to access protected (e.g., encrypted) data. The relevant key material may be removed from the endpoint when a behavioral analysis suggests that the endpoint is compromised. In this manner, the endpoint may be protected from data leakage using behavioral threat detection techniques.

As shown in step 702, the method 700 may include labeling objects on an endpoint with a labeling scheme in which the objects are either IN or OUT. This may, for example, use any of the techniques described herein. In one aspect, IN objects may be objects conforming to a compliance policy administered for the endpoint from a remote threat management facility, while OUT objects may be objects that do not conform to the compliance policy. Labeling objects may therefore provide a plurality of IN objects and a plurality of OUT objects, which may be any of the objects described herein including, without limitation, processes, files, data, URLs, and the like.

As shown in step 704, the method 700 may include providing IN objects of the endpoint access to encrypted files. Access may be provided using a key ring that is remotely managed. Cryptographically controlled access may be partitioned to allow for multiple users and multiple keys. In an implementation, providing access includes checking the current integrity of the system before the provisioning of keys. As described below, keys may be revoked or deleted in order to prevent further access to IN objects or IN files or data when an endpoint becomes out of compliance with a policy. In general, the keys may be restored as soon as the endpoint comes back into compliance, although other requirements may be imposed instead of or in addition to returning to compliance.

As shown in step 706, the method 700 may include detecting a compromise of the endpoint. For example, a compromise may include an IN object interacting with an OUT object. The compromise may also or instead include exposure of at least one of the plurality of IN objects to an external object. The external object may include without limitation data, a URL, an external process, an external file, and so forth. The external object may be known to be malicious or suspected to be malicious, or the security status of the external object may be unknown.

Detecting a compromise may be based on behavior observations, antivirus related observations, context from remote systems (e.g., a UTM or other device that has greater visibility and context than the endpoint in question), and the like. Detecting a compromise may also or instead include receiving an IOC or receiving an IOC pattern from the endpoint that is indicative of a compromised state. Detecting the compromise of the endpoint may include behavioral analysis, malware signature analysis, reputation analysis, access to a remote command and control resource, and so forth. A variety of behavioral threat monitoring techniques are known in the art and may be suitably adapted for use in detecting a compromise as contemplated herein. In general, these techniques may evaluate behaviors based on computer activities, users, files, local and network data channels, and so forth to identify high-risk behaviors of an endpoint that deviate from normal behavior and indicate a particular threat or otherwise merit intervention or remediation. Similarly, a variety of other antivirus and intrusion detection techniques are known based on detecting specific, known instances of malware using, e.g., signatures, fingerprints, or other static threat detection data, and all such techniques may be used to detect the compromise of an endpoint as contemplated herein. Still more generally, the remedial action contemplated herein may be adapted for use with these or any other techniques known in the art for detecting malicious activity on the endpoint.

A monitoring facility may detect a compromise of an endpoint. The monitoring facility may be any monitoring facility as described herein or otherwise known in the art. The monitoring facility may include an internal monitoring facility (i.e., on the endpoint) or an external monitoring facility. The monitoring facility may send a signal to the endpoint to conform to the compliance policy to access the encrypted files. Also, the monitoring facility may send a signal to the endpoint to place itself into a state of compromise, upon which it may shred its keys, when a compromise is detected. The monitoring facility may also include additional content.

As shown in step 708, the method 700 may include deleting key material cached on the endpoint from the key ring in response to detecting the compromise. This may effectively revoke access to the encrypted files by the endpoint and prevent any further use of or access to the IN data and files. Deleting data in a memory or file system may simply result in deletion of a pointer to the corresponding data. In order to more completely delete key material and prevent retrieval, more secure deletion techniques may optionally be employed such as explicitly overwriting all memory locations that contained key material with a predetermined or random pattern of bits.

As shown in step 710, the method 700 may include monitoring objects and files. For example, the method 700 may include monitoring at least one of the objects for compliance with the compliance policy, and monitoring at least one of the encrypted files for compliance with the compliance policy. Monitoring for compliance may include monitoring a behavior of the objects, where the behavior includes an interaction with one or more other objects on the endpoint.

A reactions and preventions firewall will now be discussed. In general, a reactions and preventions firewall may involve using the reputation and color for objects (as discussed herein), which may be related to the behavior of the objects, to firewall an object. This may be particularly useful for firewalling applications. For example, a reactions and preventions firewall may isolate an application from certain servers, network locations, other objects, and the like using temporary network rules based on the application's reputation and color provided by monitoring its behavior.

Figure 8:
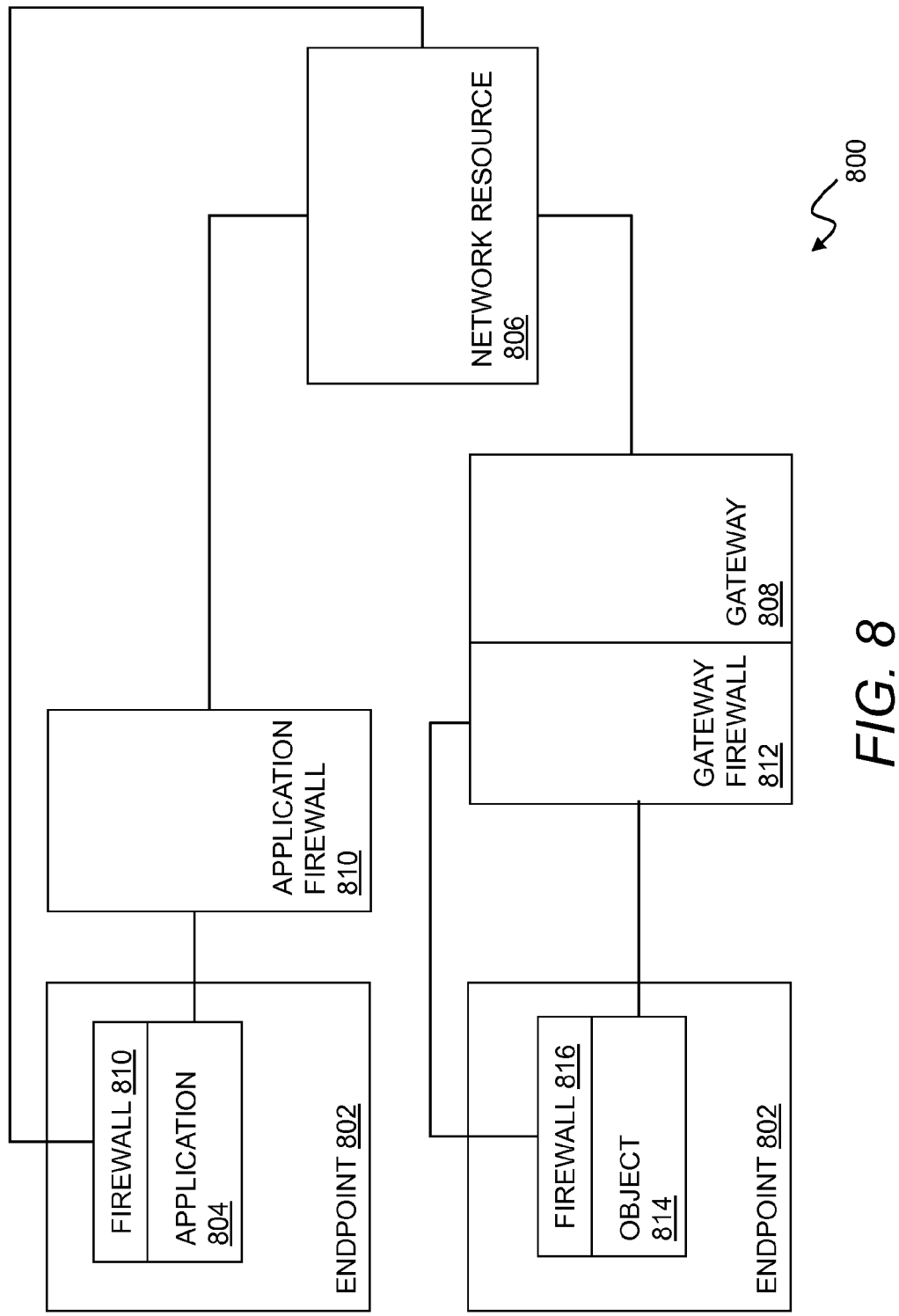
FIG. 8 illustrates a system for a reactions and preventions firewall.

FIG. 8 illustrates a system for a reactions and preventions firewall.

Generally, the system 800 may include endpoints 802 having applications 804 and other objects 814 that access network resources 806 through a gateway 808. The interaction between the applications 804 on the endpoints 802 and the network resource 806 may be protected by one or more firewall that conditionally control network access according to a set of firewall rules. The firewall may be an application firewall 810 (which may reside on an endpoint 802 or elsewhere in an enterprise) that applies firewall rules to a particular application or process, an object firewall 810 that similarly applies a set of firewall rules to an object as described herein, or a gateway firewall 812 that applies firewall rules at a network gateway 808. The firewalls may use any firewall rules or techniques known in the art for controlling incoming and outgoing network traffic based on a rule set. While a particular configuration of firewalls is illustrated in FIG. 8, it will be understood that any number, type, and arrangement of firewalls useful for controlling network activity may also or instead be employed without departing from the scope of this disclosure. The firewalls may be configured to provide conditional, rule-based access to network resources 806 by endpoints 802 and vice-versa.

The endpoints 802 may include any of the endpoints referenced herein or otherwise known in the art. For example, the endpoints 802 may include a web server, a client device, and so forth.

The applications 804 may include any of the applications referenced herein or otherwise known in the art. For example, the applications 804 may include web applications, information worker applications, content access applications, entertainment applications, educational applications, enterprise infrastructure applications, simulation applications, media development applications, product engineering applications, and so forth.

The network resource 806 may include any physical or virtual component within the network or system 800, and may reside inside a local area network, inside an enterprise network, outside an enterprise network (e.g., on a public network such as the Internet) or in any other network location accessible to the endpoints 802.

The gateway 808 may include any gateway known in the art, including without limitation, a network gateway (i.e., a network node equipped for interfacing between networks), a computer program gateway (i.e., a link between two or more computing programs), a web page gateway, a payment gateway, a residential or local gateway, and so forth.

The application firewall 810 may be included on the endpoint 802. The application firewall 810 may also or instead be included outside of the endpoint 802. For example, the application firewall 810 may be included on a destination server, as part of a routing of the network (e.g., at the edge of a company backbone), and so forth. The application firewall 810 may be configured to provide conditional, rule-based access to a network resource 806 by the application 804 executing on an endpoint 802. For example, the application firewall 810 may include rules that restrict interaction of unknown applications with high value servers or applications of the system 800. The application firewall 810 and its associated rules may determine that an application is unknown based on its color. The color may be any of the colors as defined herein. For example, the color of an application 804 or object 814 may be based on its reputation, or the reputation of its source or attribute (e.g., the reputation of a file being loaded by an application 804).

The gateway firewall 812 may be configured to provide conditional, rule-based access from an endpoint 802 on a first network on one interface of the gateway 808 to a network resource 806 on a second network on another interface of the gateway 808.

The object 814 may include any of the objects as outlined herein. In one aspect, the object 814 includes an application 804.

The applications 804 or objects 814 may be colored or otherwise labeled as described herein, and the objects that interact with the applications 804 and objects 814 may also be colored. The color may be based on the type of application 804 or object 814. For example, all word processing applications may be colored the same. The rules used by the network or firewalls may be based on the color of the applications 804 or objects 814. In one aspect, the color includes a reputation. The colors for the applications 804 or objects 814 may change over time.

The object firewall 816 may be a firewall disposed on the endpoint 802 or object 814 that protects the object 814 or resources beyond the object 814.

In general, as shown in FIG. 8, the application firewall 810 may shield interactions between an application 804 executing on the endpoint 802 and a network resource 806. Also as shown in FIG. 8, the gateway firewall 812 may be used in addition to or instead of the object firewall 816 to shield interactions between an object 814 on the endpoint 802 and a network resource 806.

Figure 9:
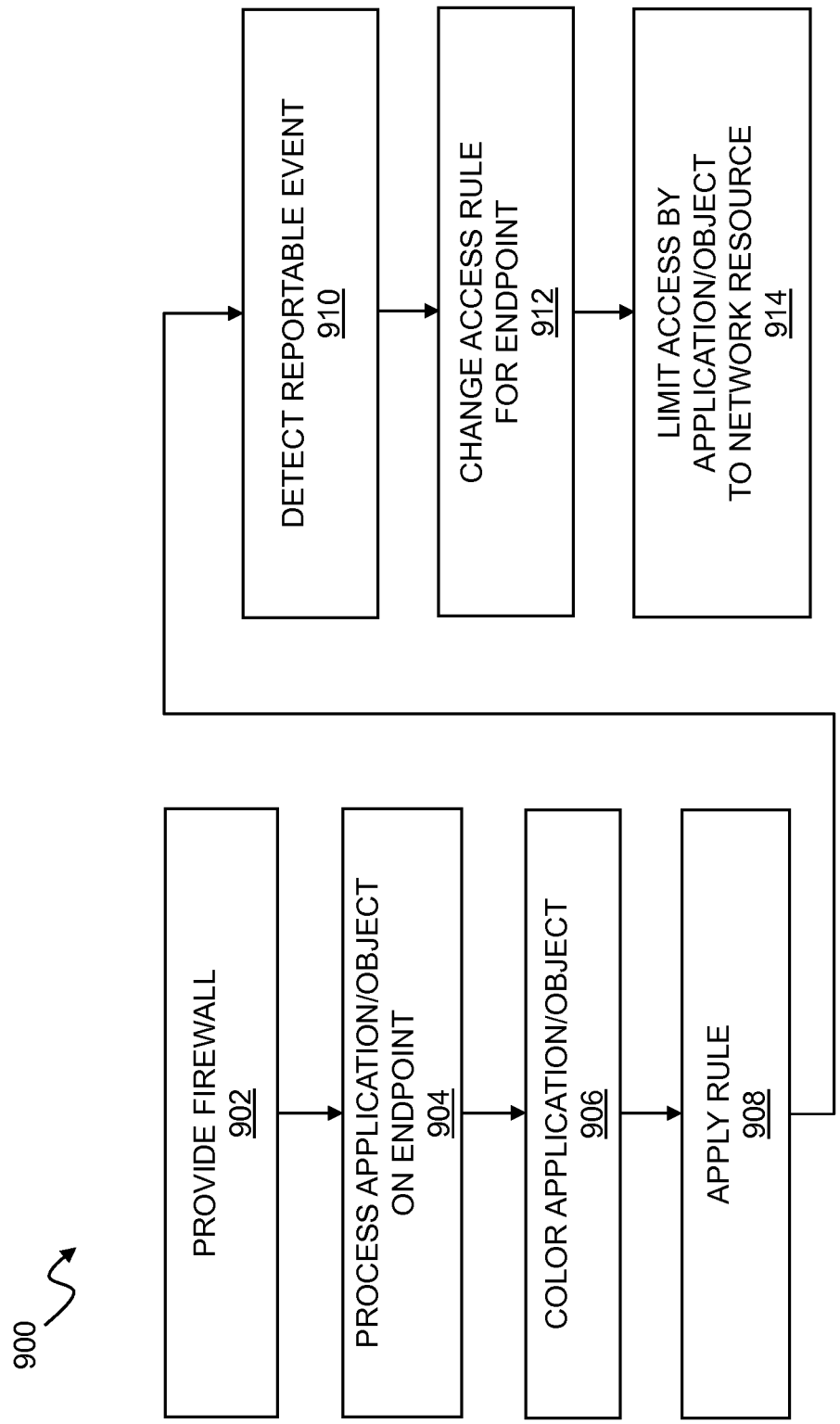
FIG. 9 is a flowchart of a method for implementing a reactions and preventions firewall.

FIG. 9 is a flowchart of a method for implementing a reactions and preventions firewall.

As shown in step 902, the method 900 may include providing a firewall. The firewall may include an application firewall configured to provide conditional, rule-based access to network resources by an application executing on an endpoint. The firewall may also or instead include an object firewall to provide conditional, rule-based access to network resources by an object on an endpoint. The firewall may also or instead include a gateway firewall configured to provide conditional, rule-based access from an endpoint on a first network on one interface of the gateway to a network resource on a second network on another interface of the gateway. The firewall may be included on the endpoint, a destination server, as part of a routing of the network (e.g., at the edge of a company backbone), and so forth.

As shown in step 904, the method 900 may include processing the application or object on the endpoint. The processing may include any processing as described herein or otherwise known in the art for the techniques described herein. For example, processing the application or object may include monitoring, analyzing, observing, etc., a behavior or action of the application or object.

As shown in step 906, the method 900 may include coloring the application or object on the endpoint. The coloring may be in response to a first observed action. Coloring may include any coloring, labeling, or the like as described herein, including coloring the application with a descriptor of a context for the observed action. The context may include one or more attributes selected for a relevance to threat detection. The descriptor may include a category for an object, static threat detection information for the object, a specific identifier of the object, and the like. The object may include without limitation an application, an item associated with an application, an item accessed by an application, and so forth.

As shown in step 908, the method 900 may include applying a rule. The rule may be dependent on the descriptor in response to another observed action of the application or object (e.g., a second observed action) to detect a reportable event. The rule may also or instead include firewall rules, where the method 900 further includes applying the firewall rules based on a reputation of the application or object. In one aspect, the rules are applied when the application launches. The rule may depend on a plurality of observed actions on the endpoint.

As shown in step 910, the method 900 may include detecting the reportable event, e.g., based on a rule violation. The reportable event may include a determination that the endpoint is in a state of compromise.

As shown in step 912, the method 900 may include changing an access rule for the endpoint at the firewall based upon the reportable event. This may include changing an access rule at the gateway for the endpoint based upon the reportable event. For example, the firewall rules may prevent all applications that are running or are subsequently launched from interacting with high value servers/objects after a compromise is detected.

As shown in step 914, the method 900 may include limiting access by the application or object to a network resource with the firewall based on the reportable event.

In general, the systems and methods discussed above for a reactions and preventions firewall may be responsive to a color change (e.g., a behavior change) of an application or object. In a simple example, an application will be highly trusted if it is colored IN, and it will be untrusted if it is colored OUT. The systems and methods may thus monitor the behaviors and actions of applications and objects to detect color changes. By way of another example, the color of an application may change if it interacts with an object that is untrusted, and thus the application may no longer be able to pass through the firewall.

Another example of the systems and methods discussed above for a reactions and preventions firewall may include the following scenario. A word processing application may be given a long term trusted status by a system, which would allow it to connect through to other applications and severs. However, the word processing application may be monitored at runtime, and if during runtime it interacts with an untrusted web server, the application firewall rules may be applied to prevent it from interacting with local high value servers, e.g., corporate servers and applications. In this manner, the treatment and "opinion" of an application may change. Also, when an untrusted (or low reputation) application is executed, the application firewall rules may be applied such that the application cannot connect to local servers.

Reputation of locally normalized IOCs will now be discussed. The IOCs may be any as discussed herein, and for instance may include individual events or actions that are detected on a machine. As discussed herein, IOCs may be normalized across different platforms, so for example, adding a process to run on startup can be done on iOS, MacOS, Windows, Android, Linux, and so forth. Further, as explained in more detail below, techniques may include monitoring a sequence of normalized IOCs and reporting them back to a threat management facility so that a reputation can be calculated and subsequently used to determine if a compromise has occurred. Thus, the techniques for utilizing the reputation of locally normalized IOCs may work in conjunction with other aspects described herein that gather various IOCs on a device where there is a set of rules that can identify a particular IOC or a sequence of IOCs as being malicious and take action accordingly.

An implementation may include taking the concept of an IOC detecting malicious activity and using the reputation and prevalence of a sequence of IOCs to better improve the detection. By way of example, if a new version of a browser is released that behaves in a slightly different manner than a previous version, it could trigger a large number of false alarms. However, using the techniques described below, these false alarms may be averted.

Figure 10:
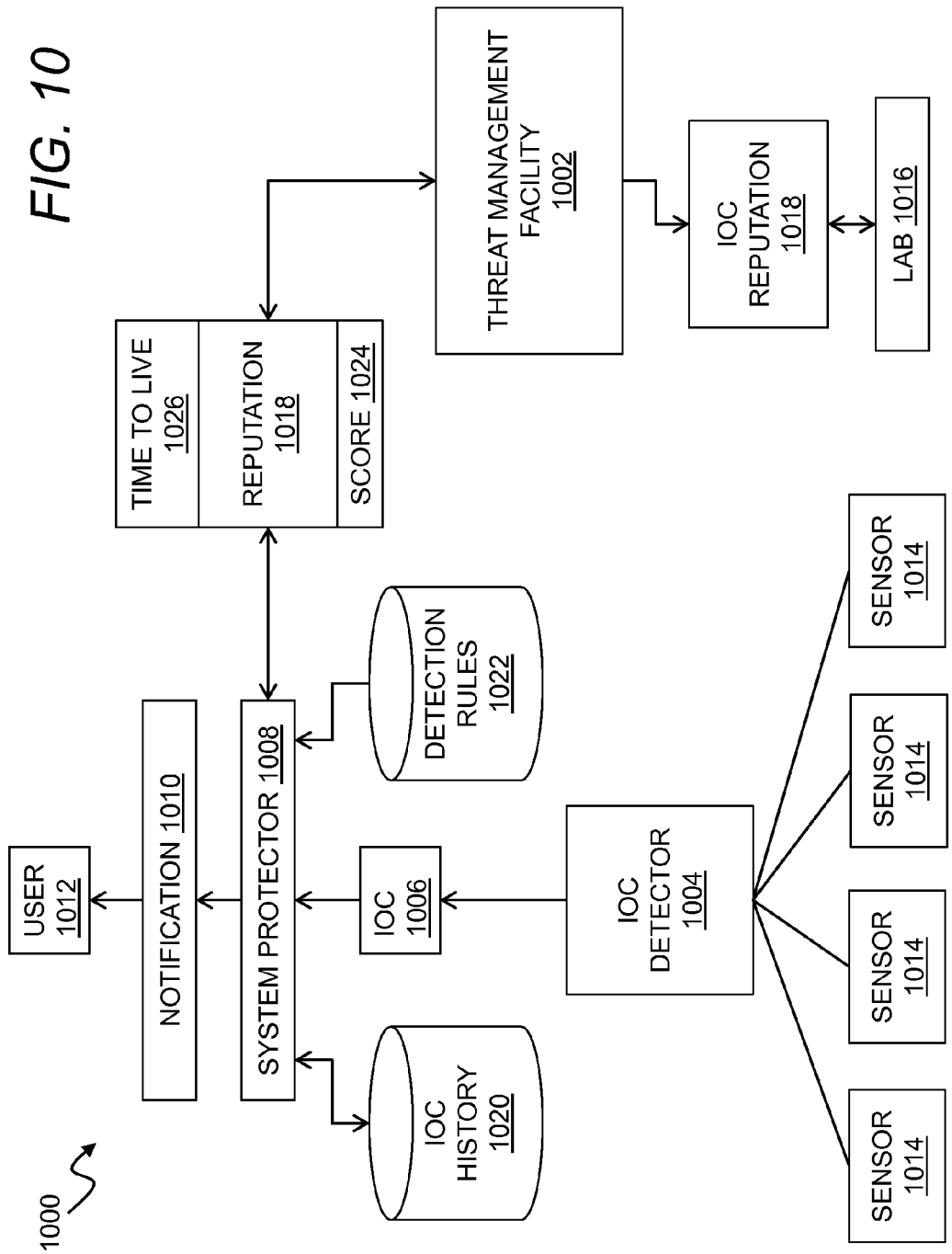
FIG. 10 illustrates a system for monitoring an IOC stream.

FIG. 10 illustrates a system for using the reputation of locally normalized IOCs. As shown in FIG. 10, the system 1000 may include a threat management facility 1002 for providing live protection to the system 1000, an IOC detector 1004 for detecting IOCs 1006, a system protector 1008 for sending notifications 1010 to a user 1012, a plurality of sensors 1014, and a lab 1016 that works with the threat management facility 1002 in generating, reviewing, revising, etc., IOC reputations 1018. It will be understood that, while the various components of FIG. 10 are given titles that differ in some aspects from other figures in this description, in many aspects similar or identical components and features are being described, and may share, modify, or augment functions of similar components described elsewhere. For example the IOC detector 1004 and the system protector 1008 may perform similar or identical functions to the IOC monitor described above, while also using collections of IOCs 1006 to determine reputation. Thus the drawings and description of various embodiments should not be understood to require or exclude any particular combination of features, but should instead be interpreted as consistent with one another except where specifically noted to the contrary.

The system protector 1008 may receive IOCs 1006 from the IOC detector 1004. The system protector 1008 may process the IOCs 1006, which may include applying detection rules 1022. The detection rules 1022 may be based on the IOC 1006 received and an IOC history 1020. In one aspect, the detection rules 1022 are a specific set of rules that identify a particular sequence of IOCs 1006 as malicious, untrustworthy, unknown, or in any way worthy of sending a notification 1010 to a user 1012 (e.g., the user 1012 may include an administrator). The IOC history 1020 may be utilized to provide the system 1000 with information regarding previous IOCs 1006 that were identified. A current IOC 1006 may be compared with IOCs in the IOC history 1020 to see if any involve a similar actions, behaviors, objects, and so forth of the current IOC 1006. The system protector 1008 may further utilize an IOC reputation 1018 in processing the IOC 1006. The IOC reputation 1018 may be any of the reputations as described herein. After the IOC 1006 is processed, a notification 1010 may be sent to a user 1012 regarding the IOC 1006.

The sensors 1014 may monitor actions, behaviors, objects, and so forth of an endpoint on the system 1000. The sensors 1014 may be used by the IOC detector 1004 for detection of IOCs 1006.

In one aspect, if no malicious activity is identified the IOCs 1006 are encoded together with related IOCs and reported to the threat management facility 1002. IOCs may be encoded in any suitable manner, such as with a graph of dependencies, with an XML schema, or any other suitable description.

The system protector 1008 may work with the threat management facility 1002 during/after processing an IOC 1006, e.g., by utilizing an IOC reputation 1018 provided by the threat management facility 1002 or lab 1016 for an IOC 1006 or a combination of IOCs 1006. The threat management facility 1002 may provide a reputation score 1024 and a time to live 1026 for a particular IOC 1006 or group of IOCs 1006. Based on the IOC-based reputation 1018, the user 1012 may be sent a notification 1010 or some other action may be taken by the system 1000. The particular IOC 1006 or group of IOCs that received a reputation score 1024 may be cached so that the same IOC 1006 or sequence of IOCs 1006 or behaviors are not repeatedly sent to the threat management facility 1002 or lab 1016 from the same endpoint, and also so that a new IOC 1006 can be evaluated where appropriate in the context of prior, concurrent and/or subsequent IOCs 1006.

The IOC-based reputation 1018 may be calculated in real time, or it may be calculated off line. For example, the IOC-based reputation 1018 may take into account the prevalence of a particular IOC sequence, e.g., the number of other endpoints or machines that have seen the same sequence. Additionally, other parameters that can be used to determine the IOC reputation 1018 may include without limitation the time first seen, geography, number of different users, and so forth.

In general, two functions are contemplated for the system 1000 shown in FIG. 10. In one aspect, groups of IOCs 1006 are regularly gathered and reported to the threat management facility 1002 along with any other suitable context for an endpoint that might be relevant to an evaluation of reputation by the threat management facility 1002. The reputation may be based, for example, on a compliance state of an endpoint, particular actions by the endpoint (e.g., access to a command and control location), URLs retrieved or otherwise accessed or used, data downloaded to an endpoint, the reputation of executables causing IOCs 1006 or otherwise present on an endpoint, executables loaded, dynamic linked libraries loaded, and any other information useful for static analysis of an endpoint or estimation of reputation. This may include, e.g., specific identification of objects, genetic identification of objects, and reputation of objects as described above. In this manner, the threat management facility 1002 can evaluate reputation to come up with an inference about current reputation, and then automatically or manually (e.g., by a human technician) create rules for determining reputation based on patterns of IOCs 1006—e.g., inferring the same reputation when the same pattern of IOCs 1006 is present.

In a second aspect, rules based on patterns of IOCs 1006 may then be distributed to endpoints. With these rules, an endpoint can locally monitor an IOC stream, and then use the rules to detect, e.g., low reputation behavior base on the IOC stream. It will be noted that this adds a layer of abstraction to the previously-described IOC monitoring, where specific IOCs were monitored in order to control, e.g., creation of reportable events to a remote resource and the application of suitable coloring rules. In this abstracted instance of FIG. 10, groups of IOCs form an IOC stream that can be further used to evaluate reputation for a context. This permits the instantiation of more complex rules in a compact, simple form layered onto potentially highly relevant streams of individual indicators of compromise.

Figure 11:
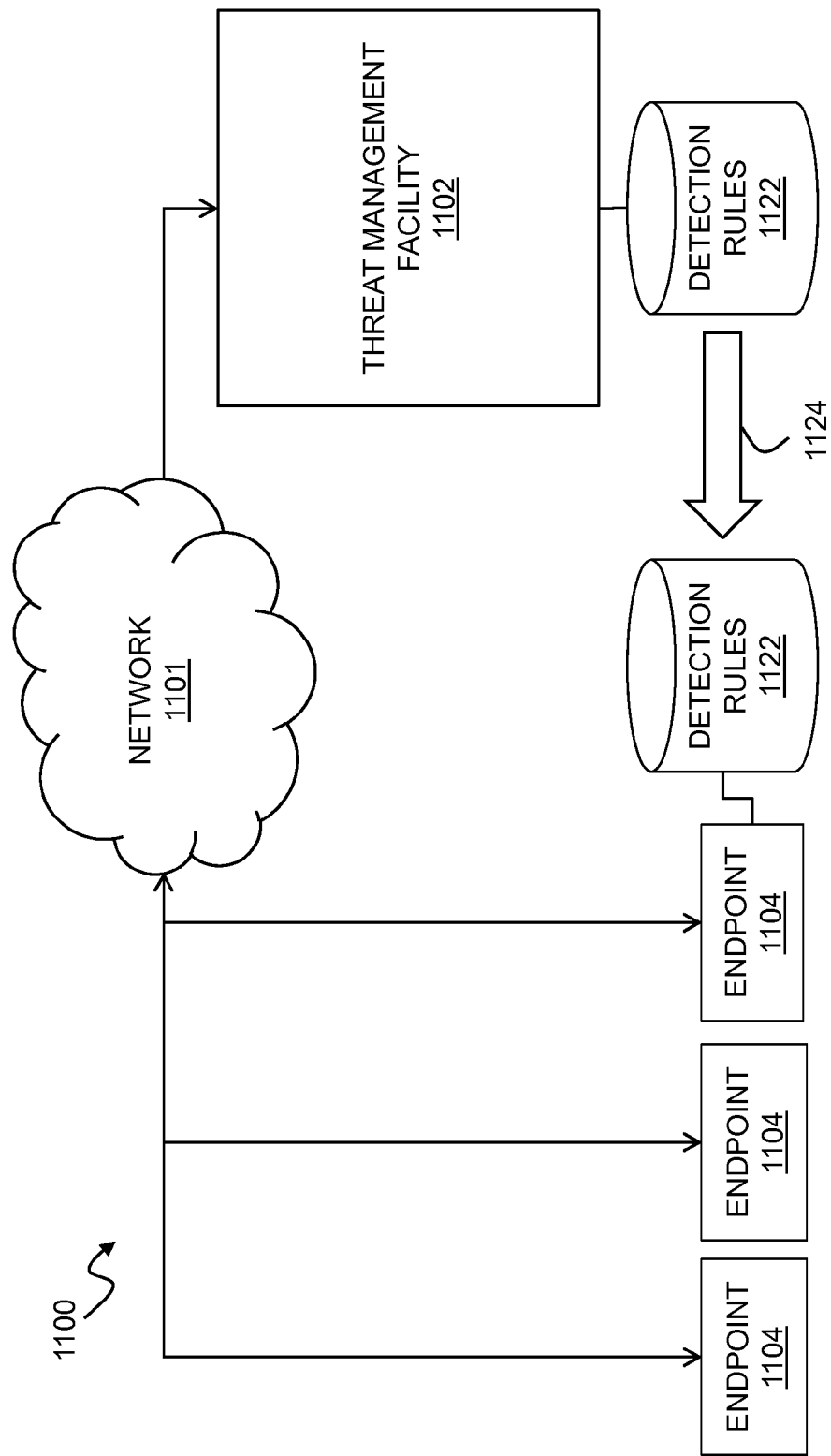
FIG. 11 illustrates a system for using an IOC stream to detect reputation.

FIG. 11 illustrates a system for using an IOC stream to detect reputation. As shown in FIG. 11, the system 1100 may include a threat management facility 1102 connected to a number of endpoints 1104 through a network 1101, which may include a public network such as the Internet, a local area network, a corporate network, an enterprise network, a cellular network, or any combination of these. In general, the threat management facility 1102 may gather a database 1122 of detection rules such as any of the rules described above for determining reputation based upon an historical analysis of various IOC streams and related context. The detection rules in this database 1122 may be transmitted (as illustrated generally by an arrow 1124 in FIG. 11) by the threat management facility 1102 to various endpoints 1104 in an enterprise. The endpoints 1104 may in turn locally monitor IOC streams and apply the rules to detect high reputation and low reputation files, actions, behaviors, and so forth.

Figure 12:
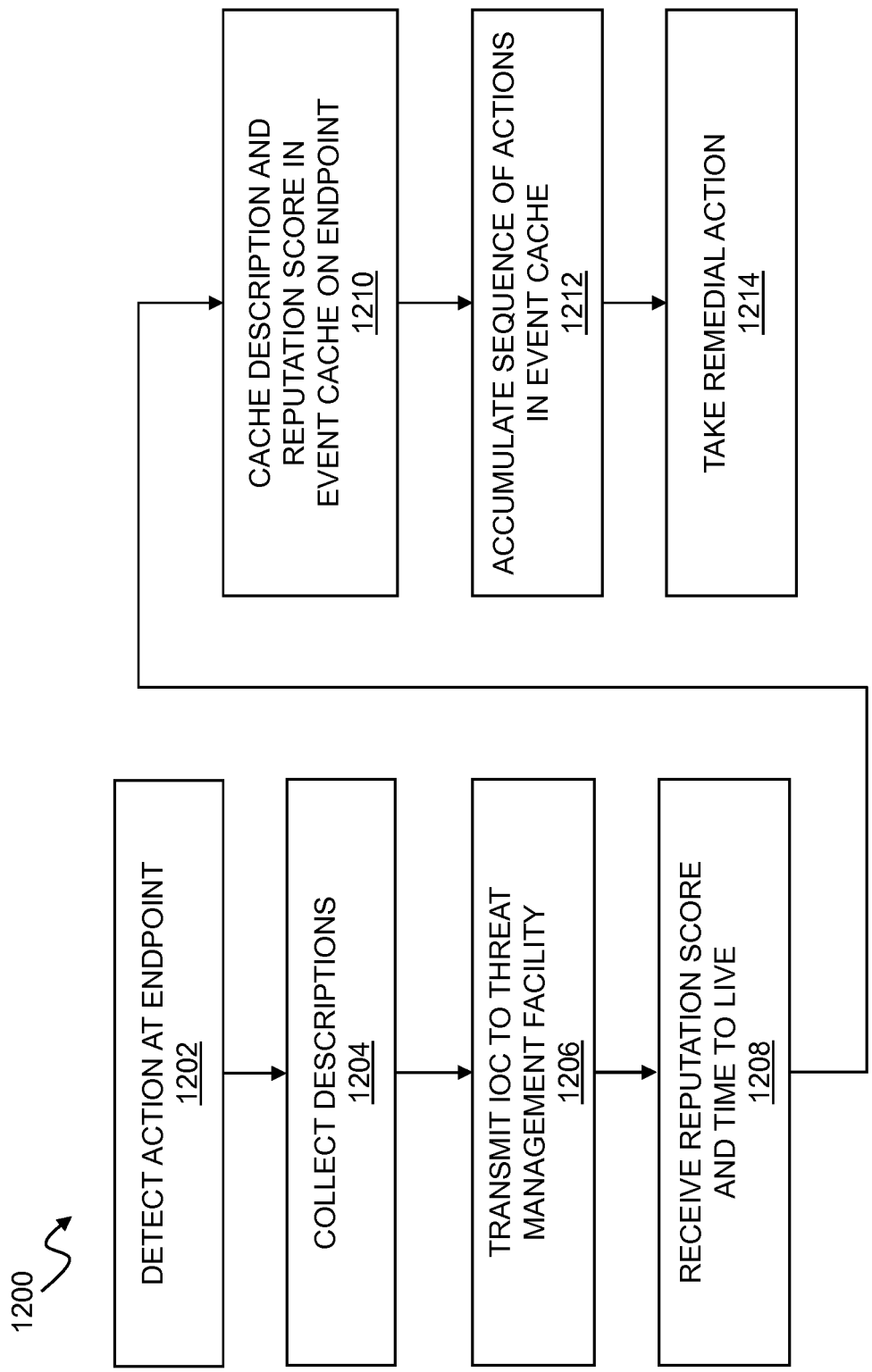
FIG. 12 is a flowchart of a method for using locally cached reputation scores for indicators of compromise.

FIG. 12 is a flowchart of a method for using locally cached reputation scores for indicators of compromise.

As shown in step 1202, the method 1200 may include detecting an action at an endpoint. This may include detecting a plurality of actions on the endpoint.

As shown in step 1204, the method 1200 may include collecting one or more descriptions of one or more actions and/or objects on the endpoint. These descriptions may be organized into any suitable structure, syntax, format, and the like for communication to a remote threat management facility as an indication of compromise (IOC).

As shown in step 1206, the method 1200 may include transmitting the IOC to a remote threat management facility. The IOC may include an identifier of a process, application or the like that took the action and an identifier of an object associated with the action, such as an object that triggered the action, was acted on by the action, received data from or provided data to the action, and so forth. The object may be any as described herein including without limitation an identifier for another resource such as a URL accessed by the action or a filename of a file used by the action.

As shown in step 1208, the method 1200 may include receiving a reputation score for the action and a time to live for the action. In general, the threat management facility may maintain a database of reputation scores for actions or IOCs that can be used to look up an appropriate reputation score and a corresponding time to live based upon the action. It will be understood that while this is described in terms of the particular action that precipitated reporting of the IOC, the reputation score and time to live may also or instead be for the IOC rather than the specific action. Thus in the present context, a score or duration for the action is intended to included a score and duration for an IOC that includes the action, although a particular lookup and result may be based specifically on the IOC or on the action without departing from the scope of this disclosure. However determined, the result may be transmitted by the threat management facility and received by the endpoint.

The reputation score may be based on any suitable factors including without limitation a geographical distribution of instances of the IOC (or, the description of the IOC) on a plurality of endpoints. The reputation score may also or instead be based on a number of prior occurrences of the description on the current endpoint, or on a plurality of endpoints in an enterprise. The reputation score may be a two-state score (e.g., good or bad), a three-state score (e.g., good, bad, unknown), a five-state score (unknown, untrusted, highly untrusted, trusted, highly trusted), a range-bounded quantity (e.g., a score from 0-10), or any other suitable score for evaluating reputation with any desired degree of granularity.

The time to live may specify a duration for retaining the reputation score or a record of the indicator of compromise on the endpoint. In this manner, particular IOCs may be ranked by reputation, and may be retained or expired as appropriate for the nature of the potential threat. For example, where an IOC becomes a conclusive indicator of a threat only when the IOC recurs several times within a predetermined interval (or occurs within a predetermined interval of other IOCs), then the time to live may accompany the IOC to ensure that it lapses if the predetermined interval passes without further IOCs. Conversely, when an IOC includes a highly trusted reputation for an application or the like, this information may be retained by the endpoint for an extended period to avoid continued reporting to the threat management facility for IOCs from the highly trusted application. More generally, a time to live for various reputation scores may ensure that information that will remain relevant over time is retained at the endpoint while information that becomes less relevant or irrelevant with the passage of time is removed from the endpoint.

As shown in step 1210, the method 1200 may include caching the description and the reputation score in an event cache on the endpoint for a duration equal to the time to live. As noted above, the reputation score will generally be removed from the cache after the time to live has passed.

As shown in step 1212, the method 1200 may include accumulating a sequence of a plurality of actions in the event cache that have not expired into the indication of compromise for communication to the threat management facility. That is, actions or IOCs in the event cache may form a new IOC, or previous actions or IOCs and reputation scores in the cache may form the basis of the IOC described above in step 1206.

As shown in step 1214, the method 1200 may include taking a remedial action, which may be taken at the endpoint when malicious activity is detected, and may include any of the remedial actions contemplated herein.

The method 1200 above may also or instead include creating a description of the action including an identifier of a process that took the action and an object associated with the action, which may thereby provide an IOC. The method 1200 may also include testing the action for malicious activity with one or more rules prior to communication to the threat management facility so that immediate remedial action can be taken as appropriate. When no malicious activity is detected, then the description may be transmitted to the remote threat management facility.

Normalization of IOCs will now be discussed. As discussed herein, observations made from within a system containing malicious software may lead to detection of previously unidentified threats. By normalizing these observations and collecting chains of observable actions performed by such threats it is possible to identify such threats regardless of the precise implementation or the system type for which it operates.

The system utilizing normalized IOCs may be any of the systems discussed herein. The system may observe activities performed within a computer system, normalize those observations into one or more objects, track changes in color (e.g., status, attributes, markers, etc.) to those objects, and track the relationship between objects by recording their interactions. By normalizing these observations into a well-defined schema of objects, colors, and actions it is possible to describe IOCs from malicious software using language that does not rely on a specific type of computer system. Patterns showing IOCs within a collected data set of normalized objects, colors, and actions may thus be applicable on different platforms such as Windows, MacOS, Android, Linux, and the like. These patterns may also be used to detect malicious software operating within the computer system without prior knowledge of the precise implementation of, or the precise activities performed by, the malicious software.

Figure 13:
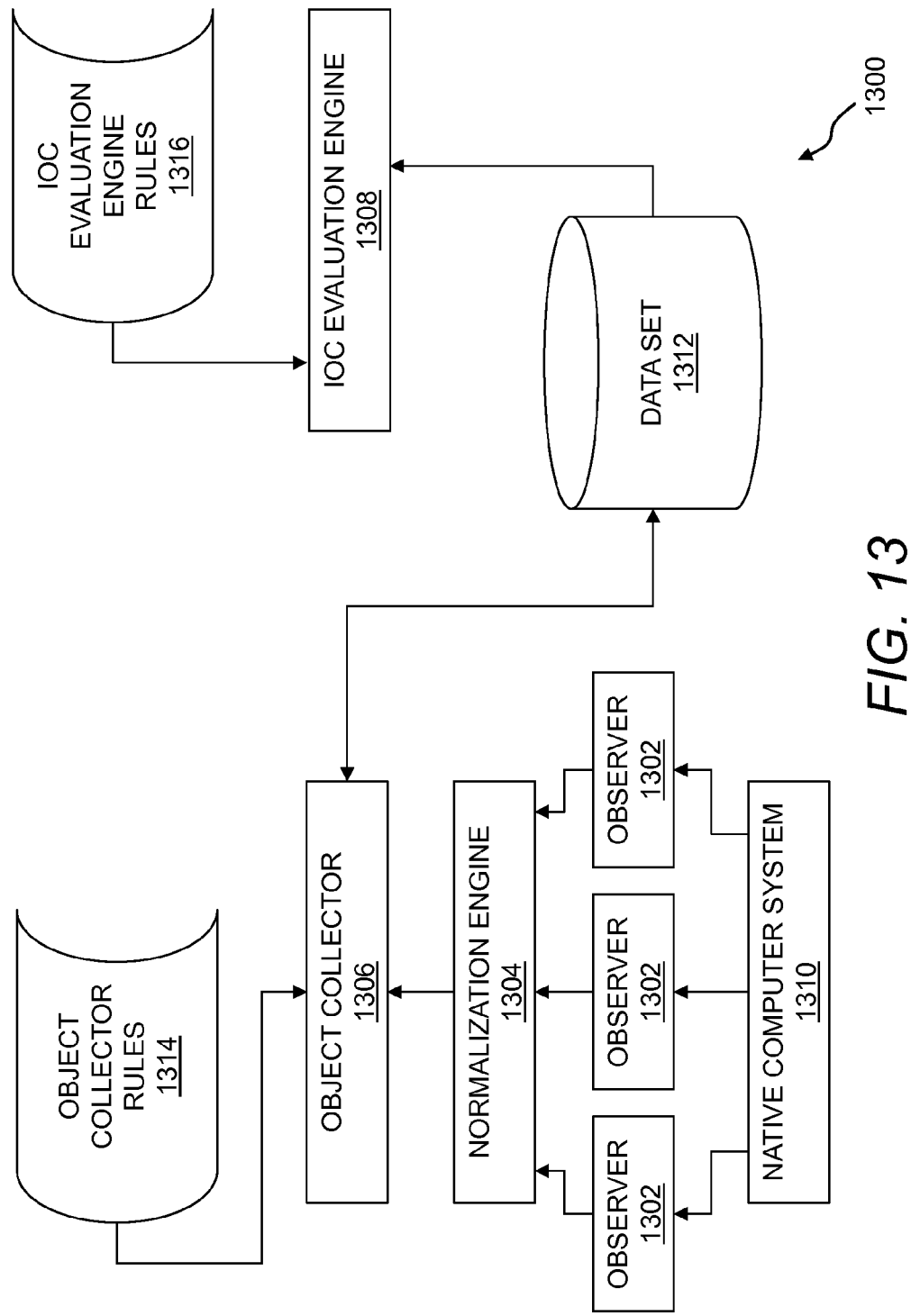
FIG. 13 illustrates a system for the normalization of IOCs.

FIG. 13 illustrates a system for the normalization of IOCs. The system 1300 may include observers 1302, a normalization engine 1304, an object collector 1306, and an IOC evaluation engine 1308.

Normalization can permit rules and analysis to have meaning across a variety of different platforms independent of hardware, software, and the like. As such, the observers 1302 may be platform-dependent software objects like drivers that are specific to a type of native computer system 1310 or platform, e.g., Mac OS X, Windows, Linux, Android, iOS, and so forth. The observers 1302 may monitor aspects of the native computer system 1310, e.g., continuously monitor any aspects of the native computer system 1310 relevant to threat detection. However, not all observations of actions and IOCs may be collected from all potential endpoint platforms. For example, more restrictive platforms (such as iOS) are structured such that less information about the details of what is happening on the platform can be collected. Nevertheless, the subset of data, observed actions, IOCs, etc., as discussed herein may be used.

The normalization engine 1304 may accept output from the observers 1302. The output may include computer system specific observations, including without limitation, IOCs, behaviors, actions, objects, and the like. The normalization engine 1304 may convert the computer system specific observations into normalized objects, colors, and actions according to a well-defined schema. Once normalized, the objects, colors, and actions may be provided to the object collector 1306.

The object collector 1306 may maintain a data set 1312 of known objects. The data set 1312 may include object colors and the interactions between different objects from the input provided by the normalization engine 1304. The object collector 1306 may create, modify, or remove existing objects or colors from the data set 1312 based on new inputs from the normalization engine 1306. The object collector 1306 may persist the data set 1312 indefinitely, or may choose to reduce the data set 1312 for performance reasons. The object collector 1306 may utilize a set of object collector rules 1314. The object collector rules 1314 may be rules for modification of the data set 1312. The object collector rules 1314 may be disposed within the object collector 1312, or may be provided by an external entity through a data service. Similarly, the data set 1312 may be disposed within the object collector 1306, or may be provided by an external entity through a data service.

The IOC evaluation engine 1308 may periodically monitor the data set 1312 held by the object collector 1306 for patterns that substantially match suspicious or malicious software acting within a computer system. To this end, the IOC evaluation engine 1308 may utilize a set of IOC evaluation engine rules 1316. The IOC evaluation engine rules 1316 and the patterns used for matching may be resident within the IOC evaluation engine 1308, or may be provided by an external entity through a data service.

When implemented it may be practical to combine the observers 1302, the normalization engine 1304, the object collector 1306, and the IOC evaluation engine 1308 together as a single software subsystem. Alternatively, one aspect separately maintains each of these components.

The system 1300 may include a uniform schema that defines the normalized objects, colors, and actions to be output from the normalization engine 1304, and consumed by the object collector 1306 and IOC evaluation engine 1308. The object collector rules 1314, which may trigger updates to the data set 1312 within the object collector 1306, may have a uniform definition regardless of the underlying native computer system 1310. Similarly, the IOC evaluation engine rules 1316 may have a uniform definition.

The implementation of the observers 1302, as well as the number of observers 1302 used, may vary when constructed for different computer systems. In other words, the system 1300 may be diverse, where there is no expectation of a uniform approach, design, or implementation. However, it may be advantageous to have a common implementation to the object collector 1306 and IOC evaluation engine 1308.

Some examples of normalized objects include objects that are readily abstracted from heterogeneous platforms into a normalized form such as executables, loaded executables, DLLs, system libraries, system executables, system configuration settings, application executables, application DLLs, application settings, user settings, user data, script interpreters, data files, processes, user identities, network listeners, application proxies, system configurations, video input or capture device data, video output devices, audio input and output devices, and so forth.

Other objects may, however, lack sufficient granularity to profile behaviors that indicate potential compromise. These objects can be usefully categorized with greater granularity than the underlying platform provides in order to usefully discriminate objects for detecting threats. These refined normalized objects may include a privileged system daemon (e.g., an executable run in the background with elevated privileges and that is known to be part of the underlying operating system), an unprivileged system daemon (e.g., an executable run in the background without elevated privileges and known to be part of the underlying operating system, a daemon configuration (e.g., a system configuration controlling the start of system daemons when the operating system boots), an application extension (e.g., an executable that is hosted by another executable, and is not a standalone program), a system enhancement application (e.g., an executable, perhaps application extension, that changes to the behavior of the operating system), a system kernel driver (e.g., this may be like a system enhancement application except this executable may run inside the operating system kernel space), a kernel driver configuration (e.g., a system configuration controlling how system kernel drivers are loaded when the operating system boots), an executable loader configuration (e.g., a system configuration controlling how executable or loadable executable files are run), an executable generator (e.g., an executable known to produce other executable files), a system management application (e.g., an executable known to modify system configuration, either remotely or locally), OS identity (e.g., a system configuration that labels the operating system and its components, including patch level), a computer identity (e.g., a system configuration that labels the local system, which may or may not be unique, and may not match the system's identity across a network), a network identity (e.g., a system configuration that identifies the system for external network entities, and may include names or addresses), a network identity resolver configuration (e.g., a system configuration identifying a service to convert network identities by name into network identities by address suitable for point-to-point network connections), network routing configuration (e.g., a system configuration to manage how network traffic is directed through one or more interfaces), network proxy configuration (e.g., a system configuration identifying a service or services to broker point-to-point network connections), network firewall configuration (e.g., a system configuration allowing or denying inbound or outbound network services), application configuration file (e.g., a data file specific to a non-system application used to store its configuration or preference data), a document file (e.g., a data file containing WORD (a word processing application available from Microsoft Corporation of Redmond, Wash.), EXCEL (a spreadsheet application available from Microsoft Corporation of Redmond, Wash.), SVG, TIFF, HTML, etc.), a document editor (e.g., an executable known to manipulate user document files), a document viewer (e.g., like a document editor, but does not modify data files), an internet viewer (e.g., like a document viewer, but interacts with data files hosted remotely over the internet), a communicator application (e.g., an executable known to allow text, audio, or video chat service), an email processor (e.g., an executable known to process inbound and outbound email), a data file exchange application (e.g., an executable known to send or receive data files), a mobile device manager (e.g., an executable known to communicate with, manage settings for, or exchange data with an external device such as a mobile phone; this may be connected via a communications channel such as USB, BLUETOOTH (a communication channel based on a wireless technology standard available from Bluetooth SIG, Inc. of Kirkland, Wash.), etc.), a system updater (e.g., an executable known to modify system components in the context of a software update), an application updater (e.g., an executable known to modify non-system components in the context of a software update, often related to a specific application from a specific vendor, e.g., GOOGLE Updater (an application available from Google Inc. of Mountain View, Calif.), an internet server (e.g., an executable known to provide documents accessible to an internet viewer application, which may be local or remote), an application proxy (e.g., an executable known to broker services, typically network services, between local or remote applications), a user identity (e.g., a system configuration that identifies a person, user, account, etc., which may be local, specific to a computer, or remote as defined by a directory service), a user privilege configuration (e.g., a system configuration defining limits, or lack of limits, for a user identity that is enforced by the operating system or applications), and so forth.

Other objects may already have abstract definitions, yet they may still be normalized for the purposes of tracking behavior. This may include objects within the operating system, or system configuration, or actions between options. Some examples and their mapping to Mac OS X and Windows are provided as follows. Computer identity may be mapped as FQDN from Mac OS X and mapped as domain and hostname from Windows; file system may be mapped as root or mounted file systems from Mac OS X and mapped as logical volumes from Windows; persistent executable may be mapped as launched, cron, login item from Mac OS X and mapped as Run/RunOnce registry, startup directory from Windows; network name resolver may be mapped as scutil from Mac OS X and mapped as netsh/ipconfig from Windows; local resolver overrides may be mapped as /etc/hosts from Mac OS X and mapped as %WINDIR%\system32\drivers\etc\hosts from Windows; and process attachment may be mapped as thread_create( ) etc. from Mac OS X and mapped as CreateRemoteThread( ) from Windows.

Each object may have certain properties such as creation or modification timestamps, active configuration values, or recorded behaviors (colors). Some examples are as follows. An executable may be colored with codesign integrity, loadable executable code, update history; a process may be colored with user visibility, privilege escalation, network activity, loaded modules, process interaction; a remote network service may be colored with protocol, risk potential of traffic, reputation; and a data file may be colored with DLP risk level, change of fundamental format.

Figure 14:
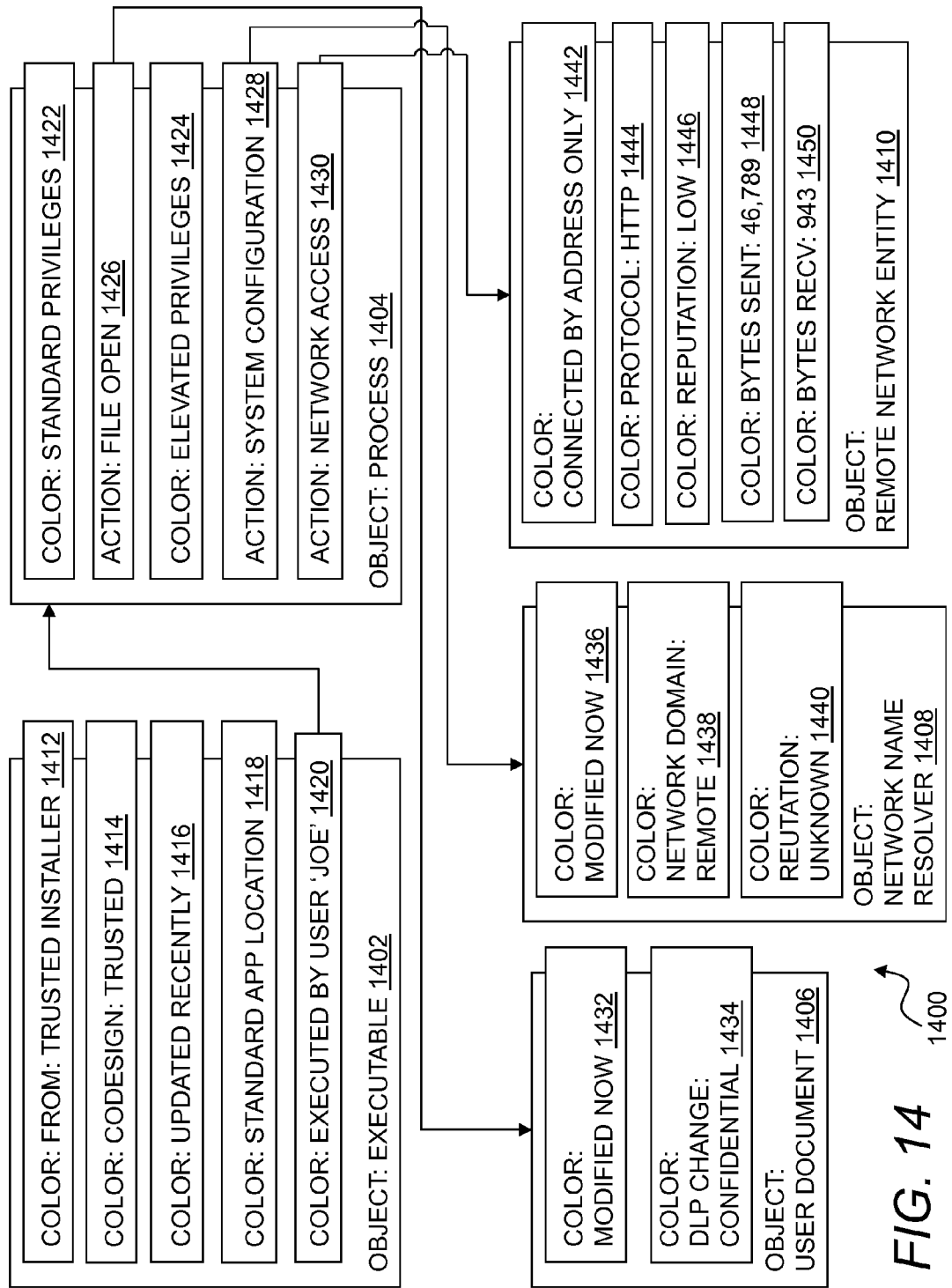
FIG. 14 illustrates examples of a relationship of objects, colors, and actions.

FIG. 14 illustrates examples of a relationship of objects, colors, and actions. The description 1400 of FIG. 14, which may be expressed as an XML schema, graph, or other representation, may be disposed within the object collector. The description 1400 may include a plurality of objects including an executable 1402, a process 1404, a user document 1406, a network name resolver 1408, and a remote network entity 1410, and so forth, all of which may be interrelated through dependencies on other objects as generally illustrated by arrows interconnecting the objects 1402, 1401, 1406, 1408, 1410.

By way of example, the executable 1402 may include colors for being originated from a trusted installer 1412, being code signed as trusted 1414, being updated recently 1416, having a standard application location 1418, and being executed by a particular user (e.g., user 'Joe' 1420).

By way of example, the process 1404 may include colors for having standard privileges 1422 or elevated privileges 1424. The process 1404 may also include actions such as file open 1426, system configuration 1428, and network access 1430.

By way of example, the user document 1406 may include colors for being modified now 1432 and for having a DLP change that is confidential 1434.

By way of example, the network name resolver 1408 may include colors for being modified now 1436, for having a network domain that is remote 1438, and for having a reputation that is unknown 1440.

By way of example, the remote network entity 1410 may include colors for being connected by address only 1442, for having a protocol that is HTTP 1444, for having a reputation that is low 1446, for having bytes sent equal to 46,789 1448, and for having bytes received equal to 943 1450.

Figure 15:
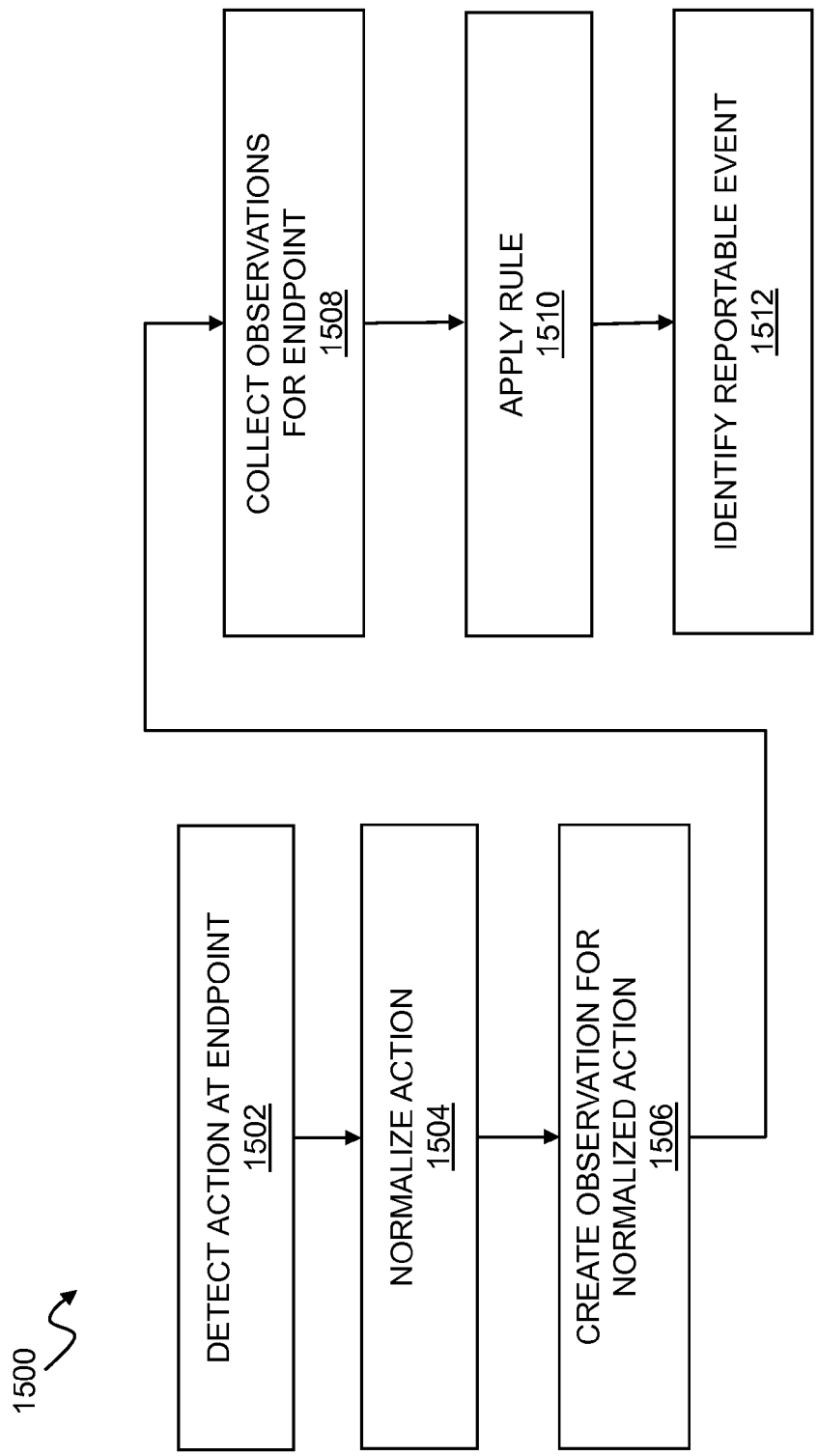
FIG. 15 is a flowchart of a method for the normalization of IOCs.

FIG. 15 is a flowchart of a method for the normalization of IOCs.

As shown in step 1502, the method 1500 may include detecting an action on an endpoint.

As shown in step 1504, the method 1500 may include normalizing the action into a normalized action. The normalized action may be expressed independently from a hardware and software platform of the endpoint, for example as described above.

As shown in step 1506, the method 1500 may include creating an observation for the normalized action. The observation may, for example, be a number of objects arranged into an IOC using a predetermined schema as described above. The schema may, for example, organize the observation into a first identifier of an object associated with the action, a second identifier of the normalized action, and one or more descriptors that characterize the observation with information selected for relevance to threat detection. The object may be any object as described herein, including without limitation, a process, a function, an executable, a dynamic linked library, a script, a file, a data structure, a URL, data, and so forth. The object may include a normalized object expressed in a manner independent from the hardware and software of the endpoint. The descriptor may include a reputation of the object, static threat detection data for the object, and the like. The static threat detection data may include a hash of the object, a signature of the object, a file size of the object, and so forth. The static threat detection data may include a reference to a data repository of threat detection information. In this manner, the static threat detection data may include data obtained from the data repository. The data repository may be locally maintained on an endpoint, or at a remote threat management facility or other suitable location (e.g., another database available throughout the network). The data repository may be periodically updated with new threat information. In this manner, additional information may be cross-referenced from data repositories where the data is available for lookup after the normalized observation has been reviewed. The descriptor or the first identifier of the object may include a name of the object as provided by the object.

As shown in step 1508, the method 1500 may include collecting a plurality of observations for the endpoint and a relationship among the plurality of observations. The relationship among the plurality of observations may be defined by a first normalized action associated with a first object and a second object that receives the first normalized action. The second object may include one or more additional normalized actions each having an additional object thereof. At least one of the plurality of observations may include a time-to-live that provides an amount of time after which the observation expires. The observation may also or instead include one or more other normalized actions each having a child object depending therefrom.

As shown in step 1510, the method 1500 may include applying a rule to identify a reportable event based on the plurality of observations and the relationship among the plurality of observations.

As shown in step 1512, the method 1500 may include identifying the reportable event.

Figure 16:
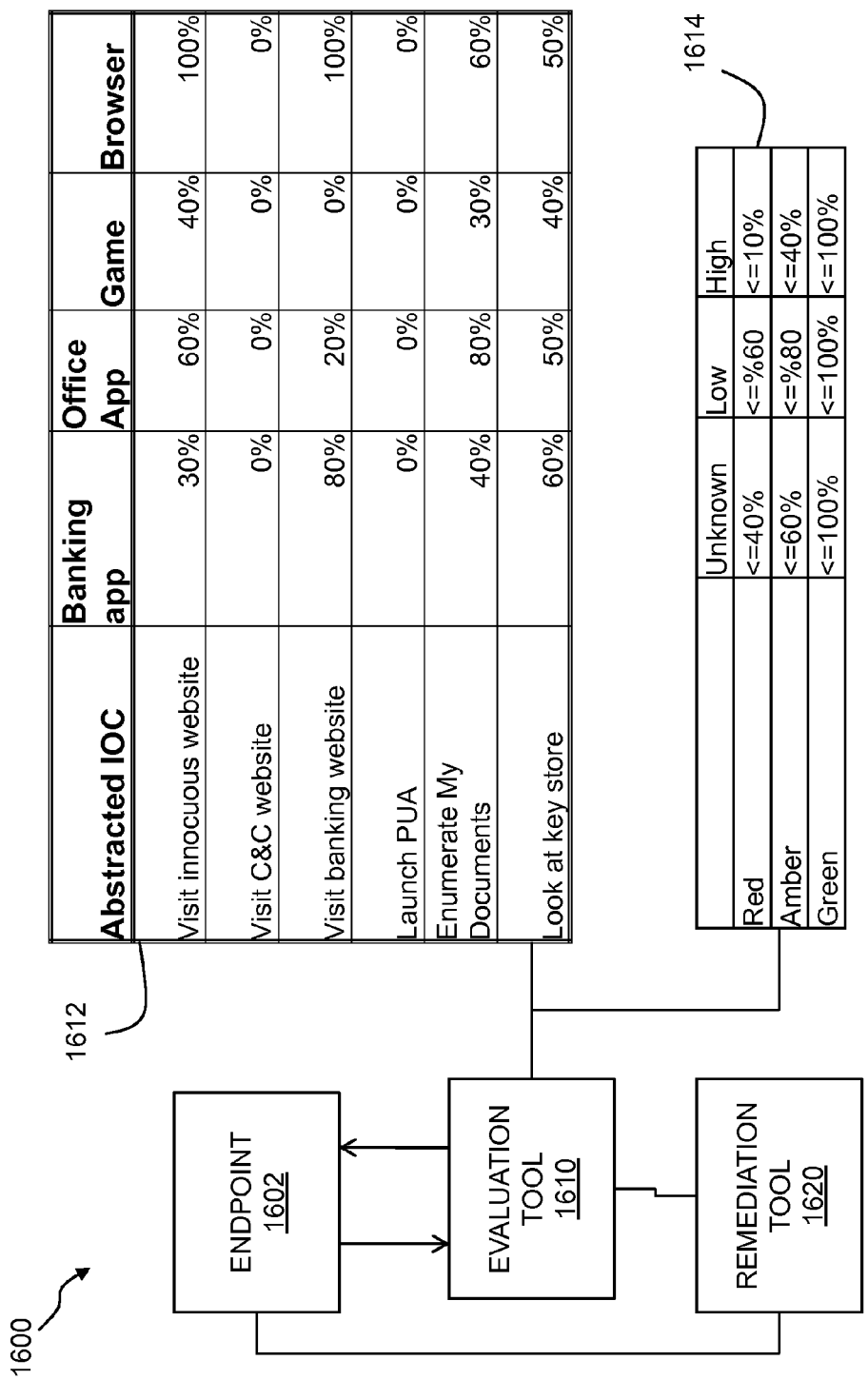
FIG. 16 illustrates a system for detecting IOCs.

FIG. 16 illustrates an evaluation tool for detecting IOCs.

The system 1600 may include an endpoint 1602 having an object such as any of the objects described herein that performs an action. In general, the endpoint may determine a type or category for the object, along with a normalized action or IOC as described above. This information may be used with a decision matrix 1612 maintained by an evaluation tool 1610 (which may operate on the endpoint, on a threat management facility, or some combination of these) to provide a numerical score for acceptability of the action/object combination. Thus for example, if the action is to enumerate a My Documents folder, then an acceptability score may be high for a productivity application such as a word processor (e.g., 80%), medium for a web browser (e.g., 60%), and low for a game (e.g., 30%). File reputation can then be used to interpret the acceptability score and use this to apply a color. This coloring matrix 1614 may, for example apply a "red" color if the file reputation is unknown and the acceptability score for the observed behavior is below 40%, and so forth.

Detecting IOCs using the system 1600 may thus be advantageous because the system 1600 may provide a category and an abstracted IOC that avoids checksum detection methods or other resource-expensive operations. Although specific categories are shown, objects may be labeled with any suitable tags such as as-platform type (e.g., MICROSOFT (a platform available from Microsoft Corporation of Redmond, Wash.), application type (e.g., productivity app, WORD (a word processing application available from Microsoft Corporation of Redmond, Wash.), OFFICE (a suite of apps available from Microsoft Corporation of Redmond, Wash.), etc.), download type (e.g., "downloads from arbitrary locations"), application load type (e.g., XML parser, etc.), and so forth. The data from these tagged objects, which may take the form of IOCs, may then be fed into a collection of data for the evaluation tool 1610. To assist in this process a tool such as an identification layer on the endpoint 1602 may include a kernel driver or the like that intercepts process startup, and then identifies context information for each new process and/or action. The identification layer may be updated, e.g., via a cloud.

The evaluation tool 1610 may create, modify, and/or implement rules. While the decision matrix 1612 describe above is one usefully technique for evaluating IOCs in a platform independent, context sensitive manner, numerous techniques may be used for implementing detection rules, any of which may be adapted for use in the systems and methods contemplated herein. The rules may utilize machine learning, where a rules engine learns the typical behaviors for processes. While the evaluation tool 1610 generally analyzes circumstances for malicious behavior, the malicious behavior may be identified because it deviates from a normal or expected behavior of an object, and any technique suitable for detecting such deviations may also or instead be employed. For example, if an IOC reports an abnormal connection for a particular application (e.g., an abnormal URL/TCP connection), a detection may be triggered (or, at the very least, a suspicion level may be raised). By way of example, a game application would not be expected to enumerate a key store, or index every file in a document folder. If the game application were to behave in this manner, a detection may be triggered by the system 1600. The endpoint 1602 may be able to obtain the typical behaviors, e.g., using a SXL lookup or the like, in order to determine what the normal behavior for a process should be. The evaluation tool 1610 may generate a score or color for the IOCs, where such a score may indicate a threat level.

The system 1600 may evaluate the difference between an expected behavior of a program (designed or otherwise), and the observed behavior of the program, which enables the system 1600 to detect compromises. The system 1600 may continuously classify processes, and statically gather information about objects (e.g., by a process image, using cloud lookups, etc.) to produce set of abstract classifications. The IOCs may then be put into different classes based on their attributes. In this manner, IOCs may be measured against a known template of behavior for their particular class. The IOCs may then be scored or the like to indicate a threat level and alerts may be triggered based on the score.

A remediation tool 1620 may be provided to take appropriate remedial action on the endpoint 1602, e.g., fix an object flagged with an IOC, shut down an endpoint 1602, or the like.

Examples of events that can generate IOCs may include classified URLs visited, classified areas of disk accessed, classified applications, classified datafiles loaded, classified DLLs loaded, classified launching of processes, classified interprocess communication, classified network communications made, reputation of the application, installation source, signing, and so forth.

An IOC may also include any of the following information useful for characterizing an object and assessing actions detected on an endpoint: underlying executables, DLL, byte code, script, URL, file, local resource, data download, global resource accessed, and so forth. For the foregoing items, the identity may be obtained utilizing at least one of the following: category, reputation, result of any cloud lookups, gene extracted description, type of file, value of file, if it is signed, if it is encrypted, direct identification, and so forth.

The techniques for detecting IOCs may also work at a network level, where the data collected, the IOCs, etc., can be transferred over the network and grouped together over many endpoints. This may enable the identification of threats, and enable a system to block threats where a shift in usage patterns is observed. In this manner, something that would not be individually suspicious may be identified. Also, because techniques may include direct identification, the impact of blocking may be minimized. For example, a spreadsheet application may be blocked from loading a specific spreadsheet, or a spreadsheet with certain genes, while all others are allowed. Also, this information may be shared with a threat detection facility so that malicious activity may be globally blocked if desired.

FIG. 17 is a flowchart of a method for detecting IOCs.

As shown in step 1702, the method 1700 may include collecting an IOC from an endpoint. This may include collecting a plurality of IOCs from the endpoint, where each one of the IOCs is based upon one or more actions on the endpoint and one or more descriptors and objects related thereto. The descriptors may include a specific identification of one of the objects, a genetic identification of one of the objects, a category of one of the objects, and so forth. The genetic identification may be based on a characteristic or action of the object. The category may include, for example, a reputation or an application type.

As shown in step 1704, the method 1700 may include determining a reputation associated with the IOCs. The reputation may be based upon a context for the one or more actions on the endpoint.

As shown in step 1706, the method 1700 may include creating a rule for evaluating the reputation. The rule may be based upon an occurrence of the IOCs.

As shown in step 1708, the method 1700 may include applying the rule to identify the reputation based on the occurrence of the IOCs.

As shown in step 1710, the method 1700 may include taking an action based upon the reputation Taking an action may include initiating a remedial action for the endpoint.

As shown in step 1712, the method 1700 may include adding the reputation to one of the descriptors for one of the objects on the endpoint.

Metrics that may be used to directly or indirectly measure the effectiveness of a given IOC reporting system will now be discussed.

The metrics may include the ability to download script-built IOCs. The system may also include the ability to construct an IOC based on a downloaded script. This may be used to update or construct new IOCs and push them out to an endpoint or various endpoints. In an implementation of an IOC reporting system, the scripts list a set of actions, include conditionals based on a hierarchy of objects related to current objects and their various colors, and have the side effects of coloring or reporting the IOC. By way of example, the following coloring techniques may be utilized: (1) loading a given URL may color a subject, (2) creating a child may cause inheritance of a given subset of colors, and (3) a process of a specified color opening a memory mapping a process of specified color may report an IOC. For example, if a child process of a browser opens a memory mapping to another process in the system, an IOC may be reported.

The metrics may include the ability to track a hierarchy of objects. This may include understanding the origin process.

The metrics may include the ability to find or trace back to an origin file or an original point of execution. For example, assuming that a known breach has been discovered, the system may attempt to find the files, URLs, and other various bits of data that entered the specific system or process that is now a suspect of being the origin.

The metrics may include the ability to track events across reboots. Also, the metrics may include the ability to build up the reputation of an object, which may be known or unknown. Additionally or alternatively, the properties of an object may be used as a metric to directly or indirectly measure the effectiveness of a given IOC reporting system. The properties of an object may include a hierarchy, a controlling executable, a loaded file, a color, and so forth.

Performance may also or instead be used as a metric to directly or indirectly measure the effectiveness of a given IOC reporting system. Performance may include transparency on an endpoint and a scale for evaluating and responding to the IOC system. The transparency on an endpoint may include cache pollution (e.g., L1, TLB, and so forth), memory footprint, inline and parallel execution, added CPU load, and the like.

Latency may also or instead be used as a metric to directly or indirectly measure the effectiveness of a given IOC reporting system. Latency may include the time it takes between a start of an attack and an actual detection.

Scriptable composition of IOCs may also or instead be used as a metric to directly or indirectly measure the effectiveness of a given IOC reporting system.

A ratio, such as signal to noise ratio of IOCs, may also or instead be used as a metric to directly or indirectly measure the effectiveness of a given IOC reporting system. Signal to noise ratio of IOCs may include measuring a known clean system under normal use and a known breached system under normal use. For example, the system may be run in both cases (clean and breached), and then the number of IOCs that are reported may be measured. Other ratios may also or instead be used.

As will be apparent to one of ordinary skill in the art, the various systems and methods described herein may be combined with one another.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method comprising:
    detecting an action at an endpoint;
    transmitting a first indication of compromise from the endpoint to a remote threat management facility, the first indication of compromise including a description of the action, wherein the description of the action includes an identifier of a process, executing on the endpoint, that took the action, wherein the description of the action further includes a second identifier of an object programmatically associated with the process through the action;
    at the endpoint, receiving from the remote threat management facility a reputation score for the action and a time to live for the action, the reputation score based on the description of the action including the process and the object programmatically associated with the process through the action;
    caching the description and the reputation score in an event cache on the endpoint for a duration equal to the time to live;
    accumulating a plurality of the descriptions and reputation scores that have not expired in the event cache;
    expiring at least one of the descriptions and reputation scores by removing the at least one of the descriptions and reputation scores from the event cache after the time to live;
    generating a threat detection when a pattern of the descriptions and reputation scores in the event cache indicates malicious software operating on the endpoint; and
    communicating the threat detection to the threat management facility.

2. The method of claim 1 wherein the object includes a URL accessed by the action.

3. The method of claim 1 wherein the object includes a filename accessed by the action.

4. The method of claim 1 further comprising taking a remedial action at the endpoint when malicious activity is detected.

5. The method of claim 1 wherein the reputation score is based on a geographical distribution of the description on a plurality of endpoints.

6. The method of claim 1 wherein the reputation score is based on a number of prior occurrences of the description on a plurality of endpoints.

7. The method of claim 1 wherein the object is programmatically associated with the process through the action by at least one of triggering the action, being acted upon by the action, receiving data from the action, or providing data to the action.

8. A computer program product comprising non-transitory computer executable code embodied in a non-transitory computer readable medium that, when executing on one or more computing devices, performs the steps of:
    detecting an action at an endpoint;
    transmitting a first indication of compromise from the endpoint to a remote threat management facility, the indication of compromise including a description of the action, wherein the description of the action includes an identifier of a process, executing on the endpoint, that took the action, wherein the description of the action further includes a second identifier of an object associated with the process through the action;
    at the endpoint, receiving from the remote threat management facility a reputation score for the action and a time to live for the action, the reputation score based on the description of the action including the process and the object programmatically associated with the process through the action;
    caching the description and the reputation score in an event cache on the endpoint for a duration equal to the time to live;
    accumulating a plurality of the descriptions and reputation scores that have not expired in the event cache;

expiring at least one of the descriptions and reputation scores by removing the at least one of the descriptions and reputation scores from the event cache after the time to live;

generating a threat detection when a pattern of the descriptions and reputation scores in the event cache indicates malicious software operating on the endpoint; and communicating the threat detection to the threat management facility.

9. The computer program product of claim 8 wherein the object includes a URL accessed by the action.

10. The computer program product of claim 8 wherein the object includes a filename accessed by the action.

11. The computer program product of claim 8 wherein the code further performs the step of taking a remedial action at the endpoint when malicious activity is detected.

12. The computer program product of claim 8 wherein the reputation score is based on a geographical distribution of the description on a plurality of endpoints.

13. The computer program product of claim 8 wherein the reputation score is based on a number of prior occurrences of the description on a plurality of endpoints.

14. A system comprising:

a threat management facility configured to manage threats to an enterprise; and an endpoint of the enterprise having a memory and a processor, the memory storing an object and a process, and the processor configured to detect an action at the endpoint, to transmit an indication of compromise from the endpoint to a remote threat management facility, the indication of compromise including a description of the action, wherein the description of the action includes an identifier of the process, executing on the endpoint, that took the action, wherein the description of the action further includes a second identifier of the object associated with the process through the action, to receive from the threat management facility a reputation score for the action and a time to live for the action, the reputation score based on the description of the action including the process and the object programmatically associated with the process through the action, to cache the description and the reputation score in an event cache on the endpoint for a duration equal to the time to live, to accumulate a plurality of the descriptions and reputation scores that have not expired in the event cache, to expire at least one of the descriptions and reputation scores by removing the at least one of the descriptions and reputation scores from the event cache after the time to live, and to generate a threat detection for communication to the threat management facility when a pattern of the descriptions and reputation scores in the event cache indicates malicious software operating on the endpoint.

15. The system of claim 14 wherein the object includes at least one of a URL and a filename accessed by the action.

* * * * *